United States Patent [19]

Short

[11] Patent Number: 5,486,302

[45] Date of Patent: Jan. 23, 1996

[54] LUBRICANT COMPOSITION FOR FLUORINATED REFRIGERANTS USED IN COMPRESSION REFRIGERATION SYSTEMS

[75] Inventor: Glenn D. Short, Midland, Mich.

[73] Assignee: CPI Engineering Services, Inc., Midland, Mich.

[21] Appl. No.: 358,968

[22] Filed: Dec. 19, 1994

Related U.S. Application Data

[63] Continuation of Ser. No. 770,615, Oct. 3, 1991, abandoned, which is a continuation-in-part of Ser. No. 642,464, Jan. 17, 1991, abandoned.

[51] Int. Cl.$^6$ .............................................. C10M 105/34
[52] U.S. Cl. ........................ 252/56 S; 252/58; 252/67; 252/68
[58] Field of Search .......................... 252/56 S, 52 A, 252/58, 546, 67, 68

[56] References Cited

U.S. PATENT DOCUMENTS

| | | | |
|---|---|---|---|
| 2,807,155 | 9/1957 | Williamitis | 252/56 R |
| 2,852,470 | 9/1958 | Henne et al. | 252/68 |
| 2,926,139 | 2/1960 | Mott et al. | 252/68 |
| 3,458,443 | 7/1969 | Shepherd | 252/68 |
| 3,694,382 | 9/1972 | Keiman et al. | 252/56 S |
| 3,857,870 | 12/1974 | Stevens et al. | 149/19.2 |
| 3,878,112 | 4/1975 | Luck et al. | 252/68 |
| 4,024,088 | 5/1977 | Godlewski | 264/300 |
| 4,046,533 | 9/1977 | Oslund | 62/468 |
| 4,159,255 | 6/1979 | Gainer et al. | 252/56 R |
| 4,755,316 | 7/1988 | Magid et al. | 252/68 |
| 4,816,172 | 3/1989 | Kapuscinski et al. | 252/47 |
| 4,851,144 | 7/1989 | McGraw et al. | 252/52 A |
| 4,916,914 | 4/1990 | Short | 62/48 |
| 4,927,554 | 5/1990 | Jolley et al. | 252/68 |
| 4,944,890 | 7/1990 | Deeb et al. | 252/68 |
| 5,008,028 | 4/1991 | Jolley et al. | 252/68 |
| 5,021,179 | 6/1991 | Zehler et al. | 252/54.6 |

FOREIGN PATENT DOCUMENTS

| | | |
|---|---|---|
| 0406479 | 1/1991 | European Pat. Off. . |
| 0435253 | 7/1991 | European Pat. Off. . |
| 0449406 | 10/1991 | European Pat. Off. . |
| 0458584 | 11/1991 | European Pat. Off. . |
| 0470788 | 2/1992 | European Pat. Off. . |
| 0475751 | 3/1992 | European Pat. Off. . |
| 9012849 | 11/1990 | WIPO . |

OTHER PUBLICATIONS

Japanese Laid–Open Unexamined Application (Kokai) Publication No. Oct. 19, 1981 56–133241 (only considered the English Abstract).

Materials Compatibility of R134a in Refrigerant Systems, K. S. Sanvordenker, Ph.D., pp. 211–216 Jan. 1989.

Synthetic Ester Lubricants, R. S. Barnes and M. Z. Fainman Russian patent 208868, Sep. 18, 1965.

The Relationships between Structure and Rheological Properties of Hydrocarbons and Oxygenated Compounds used as Base Stocks, J. Denis (1984) No month available.

Tribological Analysis of Metal Interface Reactions in Lubricants Oils/CFC12 and HFC134a System, S. Kitaichi, S. Sato, R. Ishidoya and T. Machida (No date available).

Status Report on Polyalkylene Glycol Lubricants for use with HFC–134A in Refrigeration Compressors, Sonny G. Sundaresan and William R. Finkenstadt, Ph.D., Jul. 17–20, 1990.

Synthetic Lubricants and Operational Fluids, 4th International Colloquium, Jan. 10–12, 1984.

Synthetic Lubricants and Their Refrigeration Applications, Glenn D. Short May 1–4, 1989.

(List continued on next page.)

*Primary Examiner*—Margaret Medley
*Attorney, Agent, or Firm*—Learman & McCulloch

[57] ABSTRACT

A lubricant composition of suitable viscosity miscible nonchlorinated, fluorinated hydrocarbon refrigerants includes polyhydric alcohol esters, such as TMP, mono and/or dipentaerythritol esters, made with branched carboxylic acids.

3 Claims, 24 Drawing Sheets

OTHER PUBLICATIONS

Ester Base Stocks, J. Szydywar 1984 (No month available).
Neopentyl Polyol Esters, Thomas G. Smith 1962 (No month available).
Selection and Performance of Synthetic and Semi–Synthetic Lubricants for use with Alternative Refrigerants in Refrigeration Applications, Glenn D. Short and Richard Cavestri Jul. 17–20, 1990.
Refrigerating Oils for Alternative Refrigerants, Takashi Kaimai—Jul. 17–20, 1990.
New and Unique Lubricants for use in Compressors Utilizing R–134a Refrigerant, Scott T. Jolley Jul. 17–20, 1990.
Lubricants, Refrigerants & Systems—Some Interaction, Ashrae Annual Meeting, Jun. 25–29, 1972, Keshav S. Sanvordenker and M. M. Larime Lubricants and Related Products, Dieter Klamann, pp. 130–133.
Lubricants Suitable for Oil Flooded Screw Compressors with R–22 and R–134a as Refrigerants, Glenn D. Short 1988 (No month available).
Japanese Laid–Open Patent Publication No. 55–155093 Mar. 12, 1980 (only considered the English Abstract.
Japanese Laid–Open Unexamined Application (Kokai) Publication No. 55–105644 Aug. 13, 1980 (only considered the English Abstract).
Japanese Laid–Open Unexamined Application (Kokai) Publication No. 55–157537 Aug. 12, 1980 (only considered the English Abstract).

5,486,302

LUBRICANT COMPOSITION FOR FLUORINATED REFRIGERANTS USED IN COMPRESSION REFRIGERATION SYSTEMS

This is a continuation of application Ser. No. 07/770,615 filed on Oct. 3, 1991 now abandoned which is a continuation-in-part of Ser. No. 07/642,464, filed on Jan. 17, 1991, now abandoned.

TECHNICAL FIELD

The present invention relates to fluid compositions for compression refrigeration systems for lubricating heat pumps, refrigerating compressors and air-conditioning compressors.

BACKGROUND ART

Commercial development has led to advances in the manufacture and use of lubricants that are miscible with HFC-134a refrigerant (1,1,1,2-tetrafluoroethane) and other fluorinated refrigerants. For example, U.S. Pat. No. 4,916,914 proposes certain lubricants, for compression refrigeration systems which utilize R134a. HFC-134a is the refrigerant of choice since the Montreal Accords restrict the production of refrigerant CFC-12 (R-12) by the year 1990 due to the refrigerants' untoward effect of depleting atmospheric ozone.

H. H. Kruse et al in "Fundamentals of Lubrication in Refrigeration Systems and Heat Pumps" which is incorporated herein by reference, pages 763–783, Ashrae Transactions Vol. 90 part 2B (1984), discusses systems of the type with which the present invention finds use. Research has developed various esters in combination with other fluids (or lubricants), such as other esters, mineral oils, polyglycols and alkylbenzenes, to be used as lubricant fluids in combination with the fluorinated refrigerants. Such esters are made by reacting an alcohol with acid. In the case of lubricants, the alcohol is a relatively high molecular weight molecule (compared to ethanol) and the acid generally ranges from $C_4$ to $C_{12}$. The most common esters derive from acids from $C_5$ to $C_{10}$.

For example, U.S. Pat. Nos. 4,302,343, 4,751,012 and 4,851,144 all relate to lubricants including various blends of esters and polyether polyols which make long lasting lubricants. The '144 patent especially relates to the need for higher viscosity and miscibility. The present invention also addresses these issues. Additionally, U.S. Pat. No. 4,755,316 discloses a composition containing one or more polyether polyols for lubricating refrigeration compressors utilizing HFC-134a. However, the prior art does not provide satisfactory viscosity and lubricity at temperatures of use in combination with miscibility of lubricant fluids consisting of esters which do not include polyglycols, in the refrigerants to be designated at those same temperatures.

Various researchers have developed lubricant fluids having modified esters therein in an attempt to produce higher viscosity grades which are miscible in the refrigerant at working temperatures. For example, the British patent application GB2216541A discloses a working fluid/lubricant combination for use in mechanical vapor recompression type heat transfer devices wherein the fluid includes an ester in combination with the refrigerant, but not the ester of the present invention.

The present invention relates to improved lubricant fluids and their method of manufacture resulting in fluids having an excellent balance of miscibility and viscosity thereby making the fluids excellent components in compression refrigeration systems. The present invention provides esters having better lubricity than polyglycols, good chemical stability over wide ranges of temperature, better wearability, and a good combination of viscosity and miscibility characteristics.

SUMMARY OF THE INVENTION

In accordance with the present invention, there is provided a lubricant composition comprising polyol esters including neopentyl alcohol, trimethylolpropane, trimethylolethane, mono and di-pentaerythritol esters, made with branched carboxylic acids, which are miscible in the desired temperature range with non-chlorinated, fluorinated hydrocarbon refrigerants, and have unexpected viscosity-miscibility characteristics.

The present invention further provides a method of making a fluid composition for use in a compression refrigeration system including blending a tetrafluoroethane refrigerant and a lubricant composition comprising mono or di-pentaerythritol esters made with branched carboxylic acids.

FIGURES IN THE DRAWINGS

Other advantages of the present invention will be readily appreciated as the same becomes better understood by reference to the following detailed description when considered in connection with the accompanying drawings wherein:

FIG. 18 shows miscibility limits of EXP-0504 with HFC-134a;

FIG. 23 is a graph showing miscibility limits of pentaerythritol esters ISO 68-100 with HFC-134a.

DETAILED DESCRIPTION OF THE INVENTION

Figure 1:
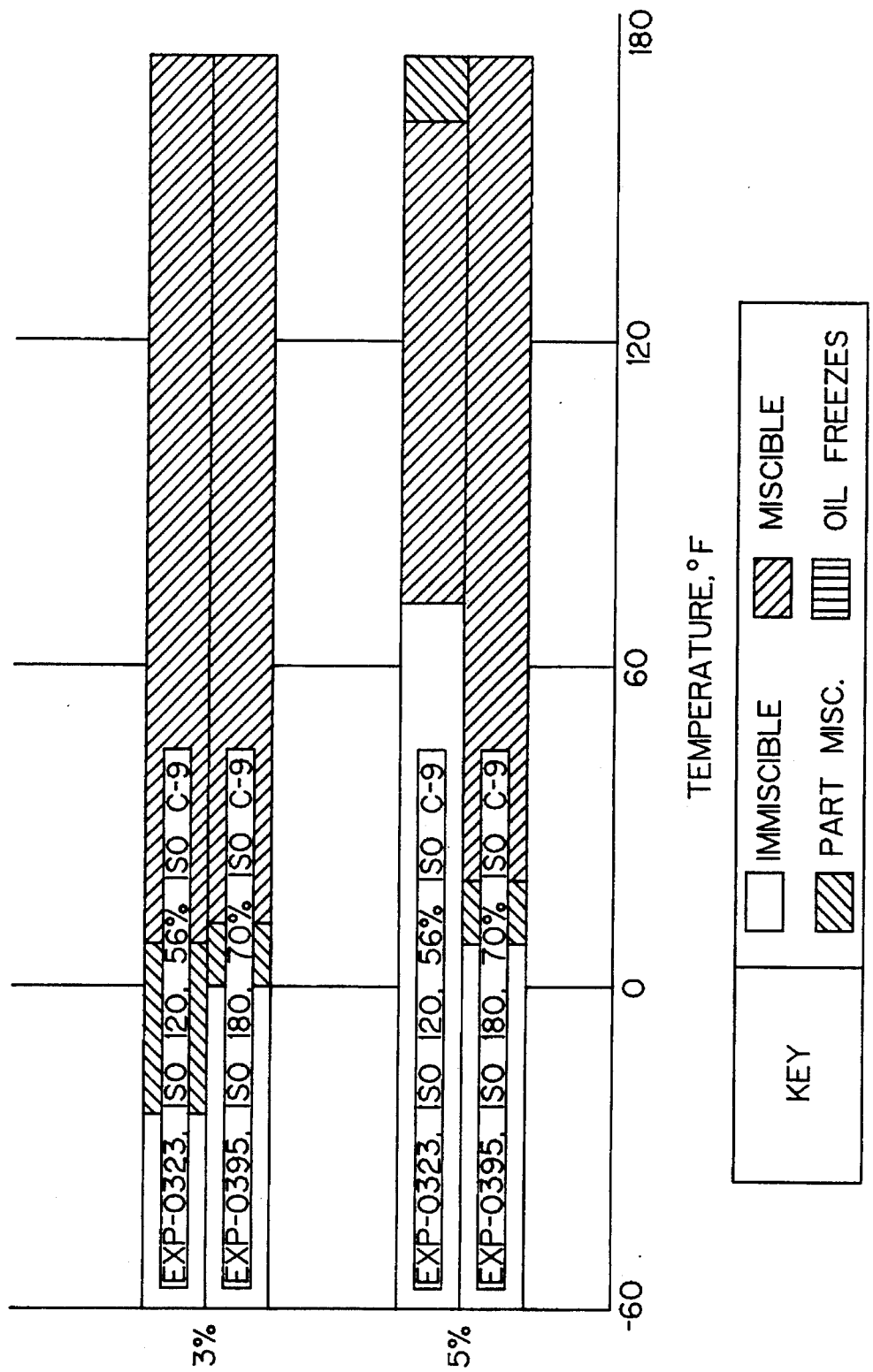
FIG. 1 shows the miscibility of several polyol esters with HFC-134a, with increased branched C-9 carboxylic acid derivation and viscosity.

A lubricant composition made in accordance with the present invention is miscible in hydrofluorocarbon, fluorine containing non-chlorine refrigerants and comprises polyolesters including mono and/or di-pentaerythritol esters made from mono and/or di-pentaerythritol and branched carboxylic acids as well as esters made from neopentyl alcohol, trimethylolpropane and trimethylol ethane. The acids used may comprise blends of linear and branched acids including the following:

| Name | CHEMICAL NAME | CHEMICAL FORMULA |
|---|---|---|
| C-4 | Butanoic Acid | $CH_3(CH_2)_2COOH$ |
| C-5 | Pentanoic Acid | $CH_3(CH_2)_3COOH$ |
| C-6 branched | Hexanoic Acid | $CH_3CH_2CH(CH_2CH_3)$ |
| (2-ethyl Butanoic Acid) | | COOH |
| C-7 | Heptanoic Acid | $CH_3(CH_2)_5COOH$ |
| C-8 | Branched Octanoic Acid | $CH_3(CH_2)_3CH$ |
| | (2-ethyl hexanoic acid) | $(CH_2CH_3)COOH$ |
| | 5-Ethylhexanoic Acid | $CH_3CH(CH_2CH_3)$ |
| | | $(CH_2)_3COOH$ |
| C-9 | Nonanoic Acid | $CH_3(CH_2)_7COOH$ |
| Branched C-9 3,5,5- | | $(CH_3)_3CCH_2CH(CH_3)$ |
| Trimethylhexanoic Acid | | $CH_2COOH$ |
| C-10 | Decanoic Acid | $CH_3(CH_2)_8COOH$ |

Di-pentaerythritol is a polyhydric alcohol which is chemically (2,2,-[oxy bis(methylene)]-bis[2-(hydroxymethyl)1)-1,3-propane diol]), or $(HOCH_2)_3CCH_2OCH_2C(CH_2OH)_3$. It is obtained as a by-product in the manufacture of pentaerythritol, chemically $C(CH_2OH)_4$, and it is separated by fractional crystallization.

The branched carboxylic acids useful in the present invention are believed to range from $C_4$ to $C_{18}$, and believed to preferably range from $C_5$ to $C_{10}$. The most preferable branched carboxylic acids are $C_8$ or $C_9$.

The branched-chain acids contain at least one branching alkyl group attached to the carbon chain which causes the acid to have different physical, and in some cases different chemical, properties than their corresponding straight-chain isomers. For example, stearic acid has a melting point of about 69° C., whereas isostearic acid has a melting point of about 58° C. Industrially, branched-chain fatty acids have a wide variety of uses as paint dryers, vinyl stabilizers, and cosmetic products. In accordance with the present invention, branched-chain acids have been found to be better than linear fatty acids because, although there is generally an increase in viscosity of the mono or di-pentaerythritol ester (also with other alcohol derivatives) with higher molecular weight linear acids, the higher molecular weight linear acids decrease the miscibility (liquid-liquid solubility) with refrigerants such as the HFC-134a refrigerant. The use of branched-chain acids allows for an increase in viscosity with lower weight acids than required from straight chain acids, thereby maintaining a higher miscibility than a straight chain acid.

Applicant has determined that multi-branched acids, such as 3,5,5 trimethyl hexanoic acid, including a tertiary butyl group, provide for excellent properties of miscibility. Further, neoacids (also referred to as trialkyl acetic acids (Exxon)) can be used. Neoacids have the formula

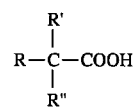

Such acids can be converted into esters by the acid chloride or by direct esterification. Formula: R,R',R" can be alkyl groups of 1 to 15 carbon atoms. The esters can include. polyolesters, mono esters, peroxy esters, etc. Preferably $C_9$ neoacids are preferred.

Applicant has determined that a preferred composition of the present invention includes branched acids wherein the branching is at a location other than the most distant carbon. That is, the branching is at least one carbon, maybe two or more carbons, that are not the terminal carbon. The examples herein showing miscibility with 3,5,5 trimethyl hexanoic acid illustrate this type of composition. Other examples are 2-ethyl hexanoic acid.

The percentage by weight of branched acids used can range as low as 20–50% or even up to 50–100% of the acids used in making the ester. Preferably, in viscosities greater than or equal to ISO 68 (Kinematic viscosity of 68cSt at 40° C.), the percent is about 45% wt. or greater (branched percent of total acids).

Examples of additional branched acids believed useful with the present invention are: 2-ethylbutyric; 1,2-dimethyl valeric, isobutyric, and 2-methyl-2-pentanoic. Blends of esters derived from branched acids with other esters may result in improved properties.

Figure 2:
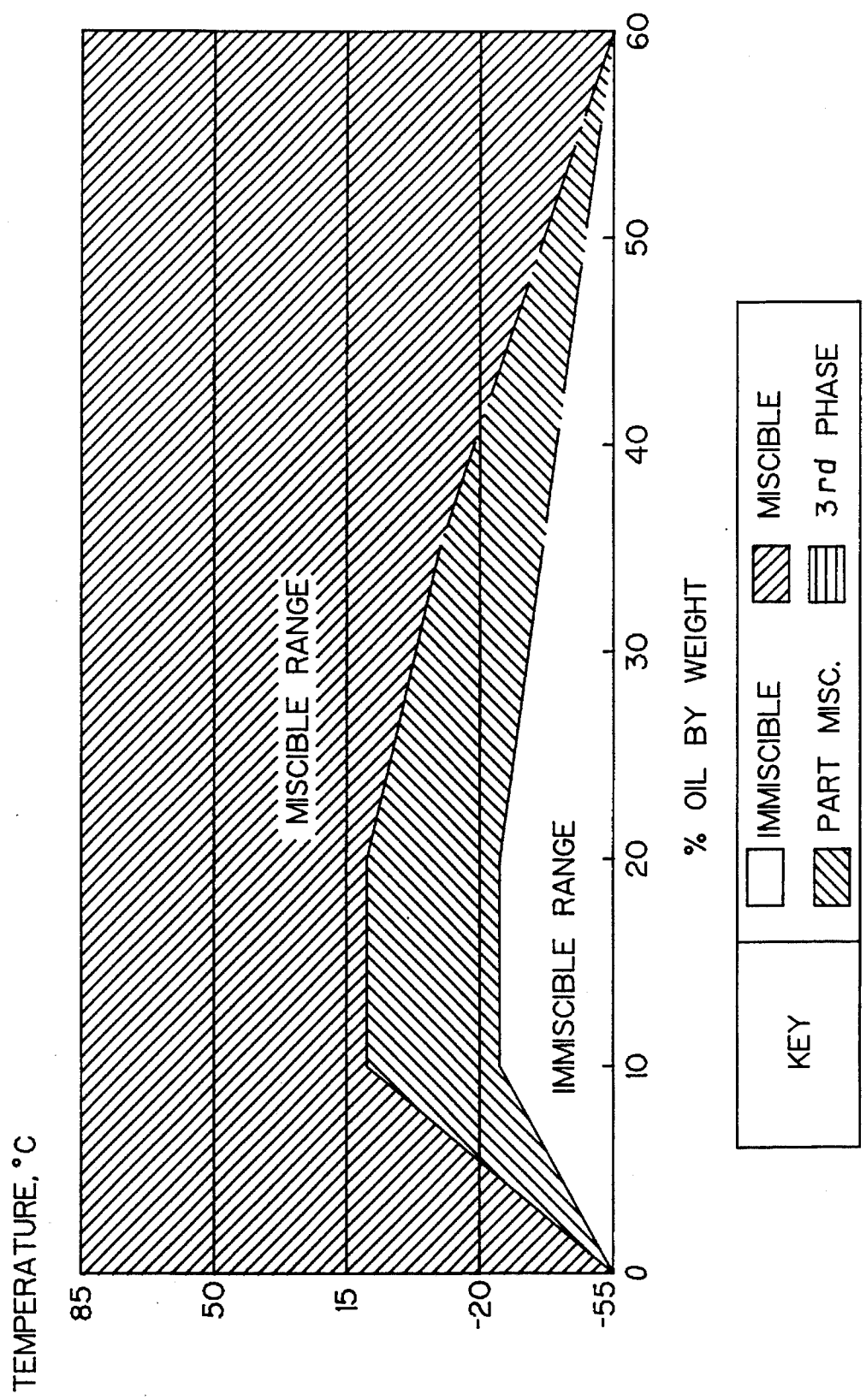
FIG. 2 shows miscibility limits with refrigerant HFC-134a utilizing test compound EXP-0316 at various temperatures and various percentages of oil (oil equivalent to the term lubricant or synthetic lubricant) by weight.
Figure 3:
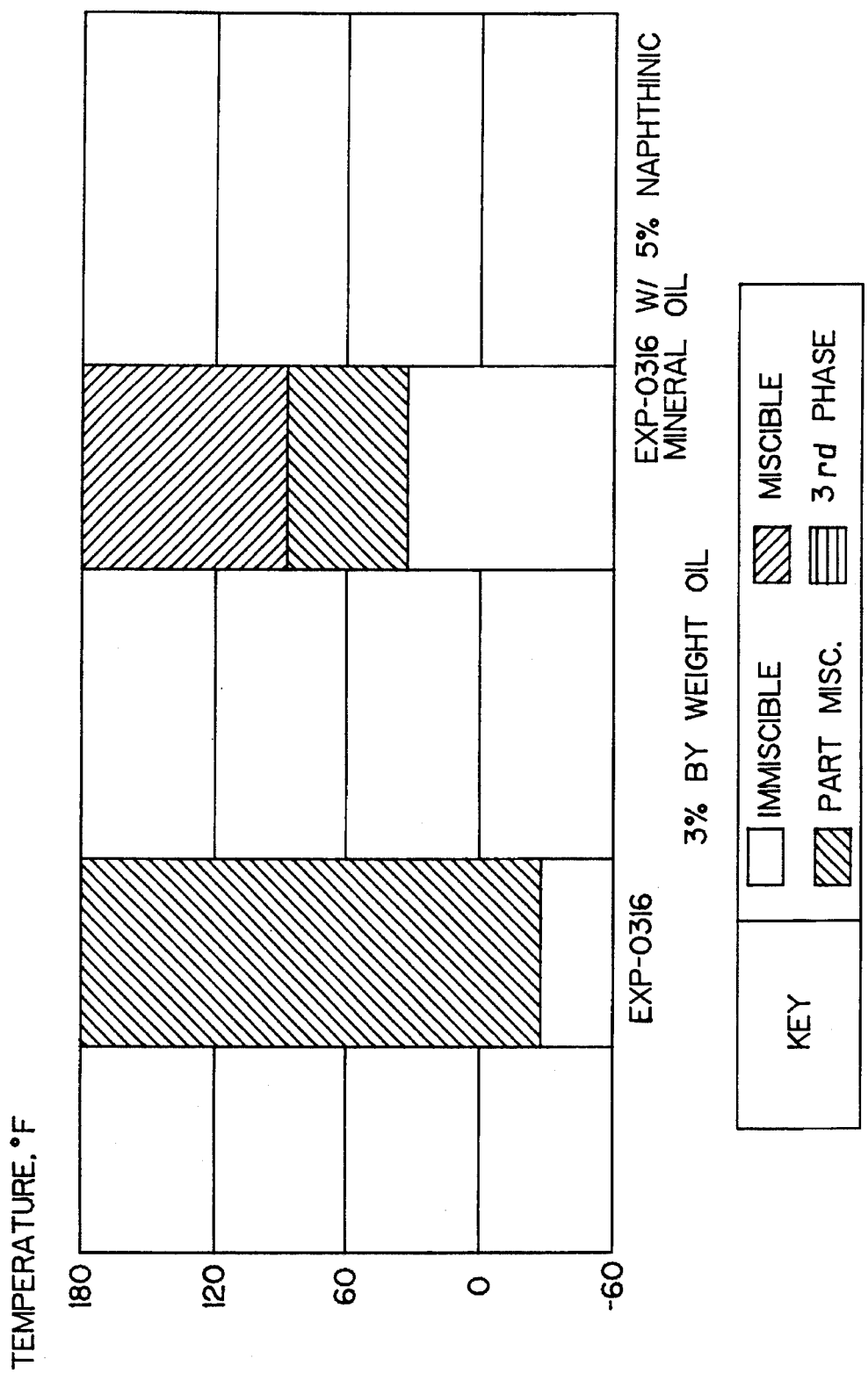
FIG. 3 shows miscibility limits of applicant's EXP-0316 blend with refrigerant HFC-134a, comparing the ester EXP-0316 alone and with mineral oil.

The fluid composition can further include trimethyolpropane polyol ester blended with the di-pentaerythritol esters. The trimethyolpropane polyol ester can be present in the blend from 0% to 95%. Preferably, the trimethyolpropane polyol ester is made from trimethyolpropane (2-Ethyl-2-(hydroxymethyl)-1,3-propane diol), chemically $H_3CCH_2C(CH_2OH)_3$, and branched fatty acids, preferably $C_8$ or $C_9$ acids. Alternatively, the trimethyolpropane polyol ester can be made from trimethyolpropane and straight chain fatty acids, preferable $C_5$ to $C_7$ acids. Excellent results have been obtained with 50:50 ratio mixtures of straight chain $C_7$ and $C_5$ linear acids used in deriving the trimethyolpropane polyol ester as shown in FIGS. 2 and 3.

The fluid composition can further include a blend of mono, tri, or tetra-pentaerythritol polyol esters combined with di-pentaerythritol esters. Again, the mono, tri, or tetra-pentaerythritol polyol esters can be made from the corresponding alcohol in combination with the branched carboxylic acids. The mixture will generally occur because commercially available di-pentaerythritol usually contains only 85–95% pure product. The impurities are generally about 10% mono-pentaerythritol with the remaining 5% being tri-and tetra-pentaerythritol.

Neopentyl, trimethylol propane (TMP) and triethanol propane are also desirable alcohols, especially in combination with 3,5,5 tri-methyl hexanoic acid as exemplified hereafter. Applicant has also determined that mono-and di-pentaerythritol function well with this acid.

The fluid composition can further include mineral oils or alkyl benzenes blended therewith. These compounds may be blended with the ester intentionally during the preparation of the composition. Alternatively, the mineral oils or alkyl benzenes may be blended with a composition through contamination by the equipment containing the fluid composition. This is a common occurrence in compressors used with refrigeration units.

A preferred composition includes:

| mono pentaerythritol | |
| --- | --- |
| 3,5,5 trimethyl hexanoic acid | approx. 70% |
| Linear $C_7, C_8$ and $C_{10}$ | approx. 30% |

Alternatively, this formulation can include 80% to 90% of the branched $C_9$. Such a formulation can include 10% to 20% di-pentaerythritol depending on if the blend is made with branch $C_9$ di-pentaerythritol or with the same alcohol but increased $C_9$.

Another alternative is to produce a very high viscosity product wherein 85% to 100% of the acid is branched $C_9$, the alcohol preferably being di-pentaerythritol. The alcohol is usually 90% to 95% pure in each formulation, containing minor amounts of mono,-tri-, and possibly tetra-pentaerythritol.

Preferably, the composition includes at most 5% of the mineral oil or alkyl benzene in solution. The composition including 5% of the mineral oil or the alkyl benzene with the fluid composition of the present invention is found to improve the solubility of the mineral oil or alkyl benzene with the HFC-134a without significant loss of miscibility from the di-pentaerythritol ester itself.

In view of the above, the present invention provides a method of lubricating compression refrigeration equipment by using a lubricant composition, miscible in hydrofluorocarbon refrigerants, and comprising esters derived from polyhydric alcohols and branched chain carboxylic acids. That is, the subject fluid composition can be mixed with hydrofluorocarbons such as HFC-134a (which may be manufactured according to U.S. Pat. No. 4,311,863), to provide lubrication in compression refrigerator equipment.

Preferably there is a sufficient amount of the lubricant in the compressor to provide lubrication and sealing. In dealing with the compressor, the lubricating fluid is thought of as a solution of refrigerant dissolved in the lubricant. Such a composition generally comprises a majority of lubricant. Of course, depending on the compressor conditions and system design, the ratio of refrigerant to lubricant could be a very high concentration. In other parts of the refrigerating system such as the evaporator, the oil may be thought of as dissolved in the refrigerant. Refrigerants are classified as completely miscible, partially miscible, or immiscible with lubricants depending on their degree of mutual solubility. Partially miscible mixtures of refrigerant and lubricants are mutually soluble at certain temperatures and lubricant-in-refrigerant concentrations, and separate into two or more liquid phases under other conditions.

Generally, it is desirable to have a high degree of miscibility in the evaporator. The evaporator is the most likely place for phase separation to occur in a refrigeration system, as it is the coldest part of the system. Partial miscibility may cause problems with heat transfer and may also interfere with the return of oils to the compressor. For compressors equipped with lubricant separators at the compressor discharge, the miscibility requirement may be for only a few percent oil-in-refrigerant. This can range up to 5% (generally about 3%) by weight. This may also apply to centrifugal compressors where the lubricant is not intended to get into the evaporator, but through leakage of compressor seals may enter the refrigerant system and eventually the condenser and evaporator. Thus, in these systems, it is desirable to have complete miscibility with the lubricant in refrigerant concentrations up to 5% by weight at the evaporator temperature (i.e. temperatures of −40° C. to 20° C.).

When an oil separator is not used, the amount of lubricant in refrigerant in the condensor may reach 15 to 20% by weight. Thus the requirement for miscibility in some systems may be 15%–20% by weight at the condensor temperature and possibly greater as the refrigerant is removed in the evaporation. The present invention further provides compositions having properties ideal for direct expansion (DX) evaporators, such as those used in automobiles.

In systems using HFC-134a as a refrigerant, air conditioning evaporators may run at temperatures as high as 60° F. Refrigeration evaporators may operate at temperatures below 20° F. Of course, there are cases in between. The present invention provides high viscosity lubricants that are miscible at 40° F. in lubricant-in-refrigerant concentrations exceeding 20% by weight. On the other hand, the present invention also provides lubricants with high viscosity that may be used for lower temperature refrigeration applications, when the lubricant-in-refrigerant concentration in the evaporator is controlled through the use of oil separation equipment, or some other method. Such lubricants are ideal for rotary screw compressors and other compressors where high lubricant viscosity provides improved compressor cylinder sealing efficiency and improved lubrication.

Examples of hydrofluorocarbon refrigerants useful in this invention are 1,1,1,2-tetrafluoroethane, 1,1,2,2-tetrafluoroethane, 1,1,1-trifluoroethane, 2,2-difluoroethane, tetrafluorodimethyl ether, trifluoromethane, methylene fluoride, methyl fluoride, difluoroethylene and pentafluoroethane.

The invention further provides a method of making a fluid composition for use in a compression refrigeration system including the steps of blending a refrigerant selected from the group of hydrofluorocarbons as discussed above and a lubricant composition comprising esters made from polyhydric alcohols and branched acids. More specifically, the method includes the step of increasing the viscosity of the lubricant composition without lowering the miscibility of the lubricant composition in the refrigerant. This is achieved by making the lubricant ester composition with branched fatty acids, as discussed above.

EXAMPLES

All viscosities were tested at 40° C. (104° F.) and 100° C. (212° F.).

FIGS. 1–24 demonstrate the improvement in miscibility and viscosity utilizing the invention. It should be noted that conventional mineral oils that are specifically refined and used for refrigeration applications are not miscible in HFC-134a. This is also true of alkyl benzenes. Miscibility of these oils with HFC-134a occurs at very low oil-in-refrigerant concentrations and at very high levels of oil to refrigerant. This type of miscibility is only useful in limited situations.

More specifically, FIG. 1 is a miscibility study of various polyol esters derived by increasing the branched (iso) C-9 content and thereby the viscosity. Applicant's esters as set forth hereinafter are described in Table I. In this table, the di-pentaerythritol ester is sometimes abbreviated as DI-PE and the trimethyolpropane polyol ester is sometimes abbreviated as TMP. Where blends of the DI-PE and TMP esters are specified in the percentages by weight of the acid blend used to make the ester follow the ester designations. Throughout this specification, the percentages by weight are used unless percentages by volume are specified. The acids used in deriving the esters are linear except for the C-9 acid designated as branched, which is virtually 100% branched. The percentages of the various organic acids C-5 to C-10 present in the acid from which the ester derives follow the step designations in the table I.

FIG. 1 shows that increasing the content of the ester derived from the reaction of the acid with the 70% branched C-9 content is significantly less effected by change in temperature than the ester derived from the acid with the 57.3 branched C-9 content. This effect is shown over the wide temperature ranges tested.

FIG. 2 shows the miscibility limits of EXP-0316 in the commonly used refrigerant HFC-134a. As shown, the ester is miscible over a broad range of percentage of oil by weight over a significantly broad range of temperatures encompassing most uses discussed.

FIG. 3 shows the miscibility limits of EXP-0316 with and without containing 5% naphthenic mineral oil. As shown, even containing the 5% naphthenic mineral oil, miscibility is at least substantially retained.

Figure 4:
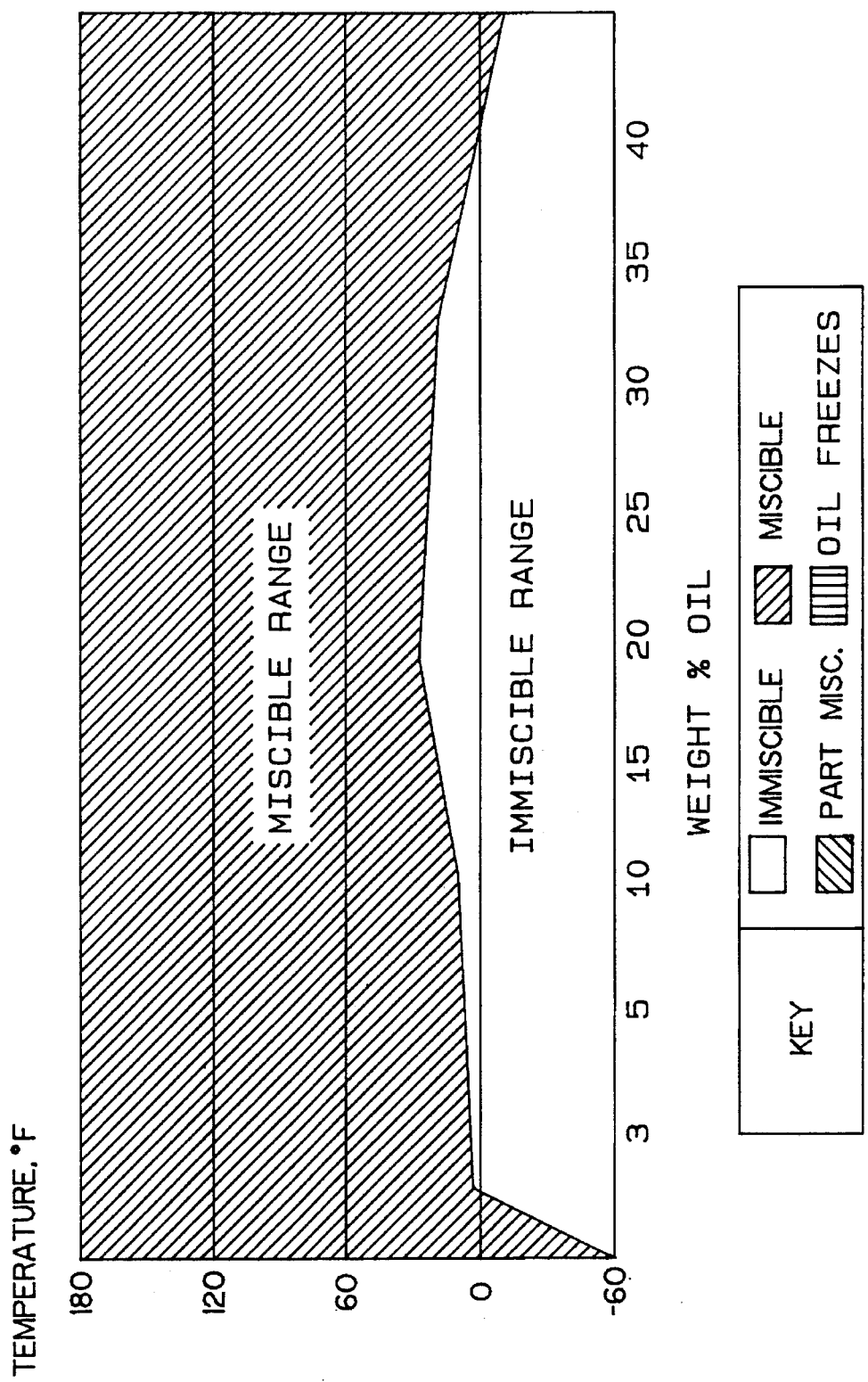
FIG. 4 shows miscibility limits of applicant's ester EXP-0440 with refrigerant HFC-134a showing the miscibility range at various weight percentages of oil and various temperatures.

For purposes of comparison, FIG. 4 shows miscibility limits with ester EXP-0440 with the refrigerant HFC-134a. EXP-0440 is a blend of two dipentaerythritol esters having a viscosity of 120cSt.

Ester EXP-0396 is derived from an acid blend comprising 70% branched C-9 acids and 30% straight chains C-7, C-8 and C-10 acids and is a monopentaerythritol ester having a viscosity of about 64 cSt.

Figure 5:
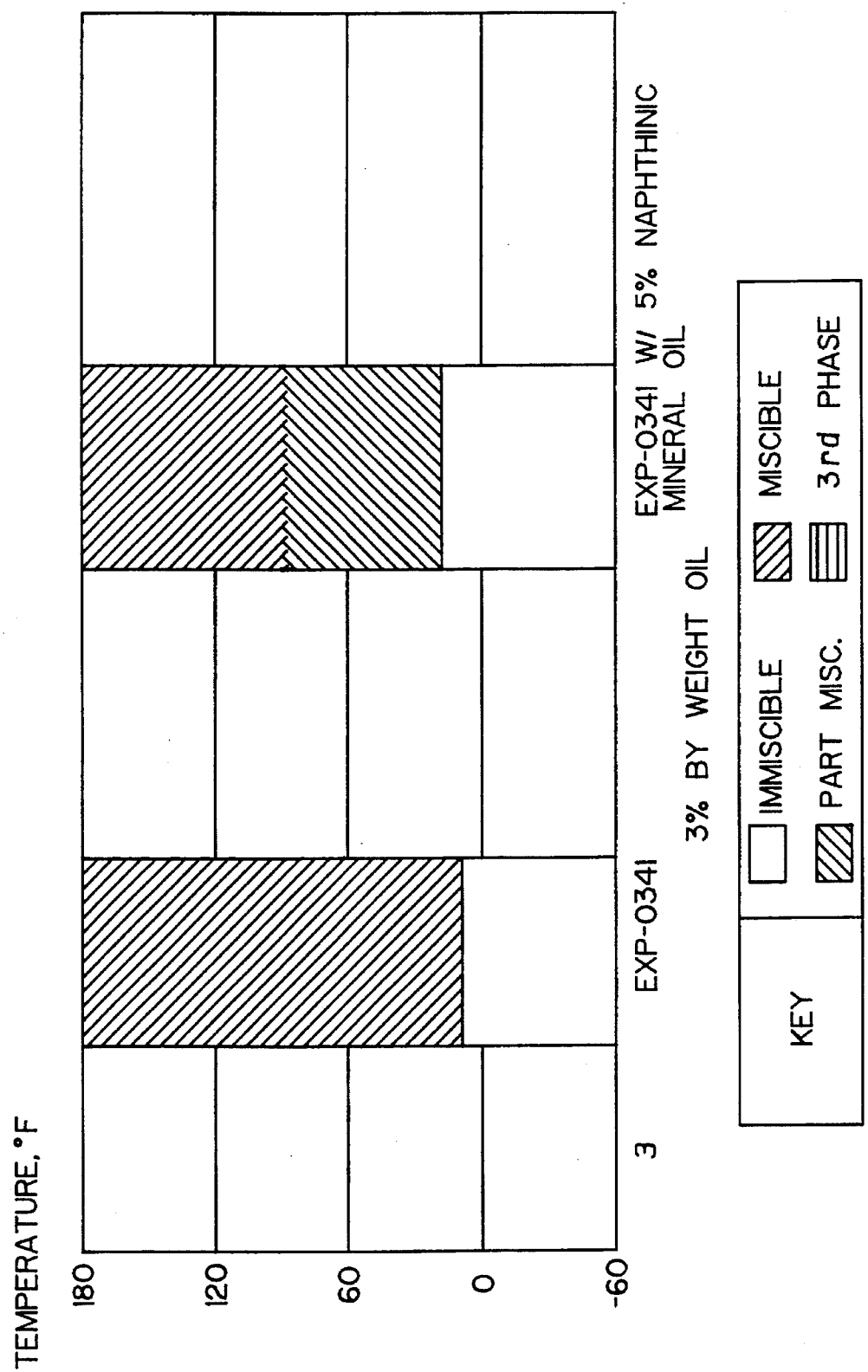
FIG. 5 shows miscibility limits with applicant's ester EXP-0396 with HFC-134a at different weight percentages of oil against temperature.

For further comparative purposes, FIG. 5 shows miscibility limits with applicant's ester EXP-0396 with the refrigerant HFC-134a at various temperatures versus various weight percentages of oil. The ester EXP-0396 has a relatively lower viscosity of about 64 cSt, as compared to EXP-0395 and EXP-0323.

Figure 6:
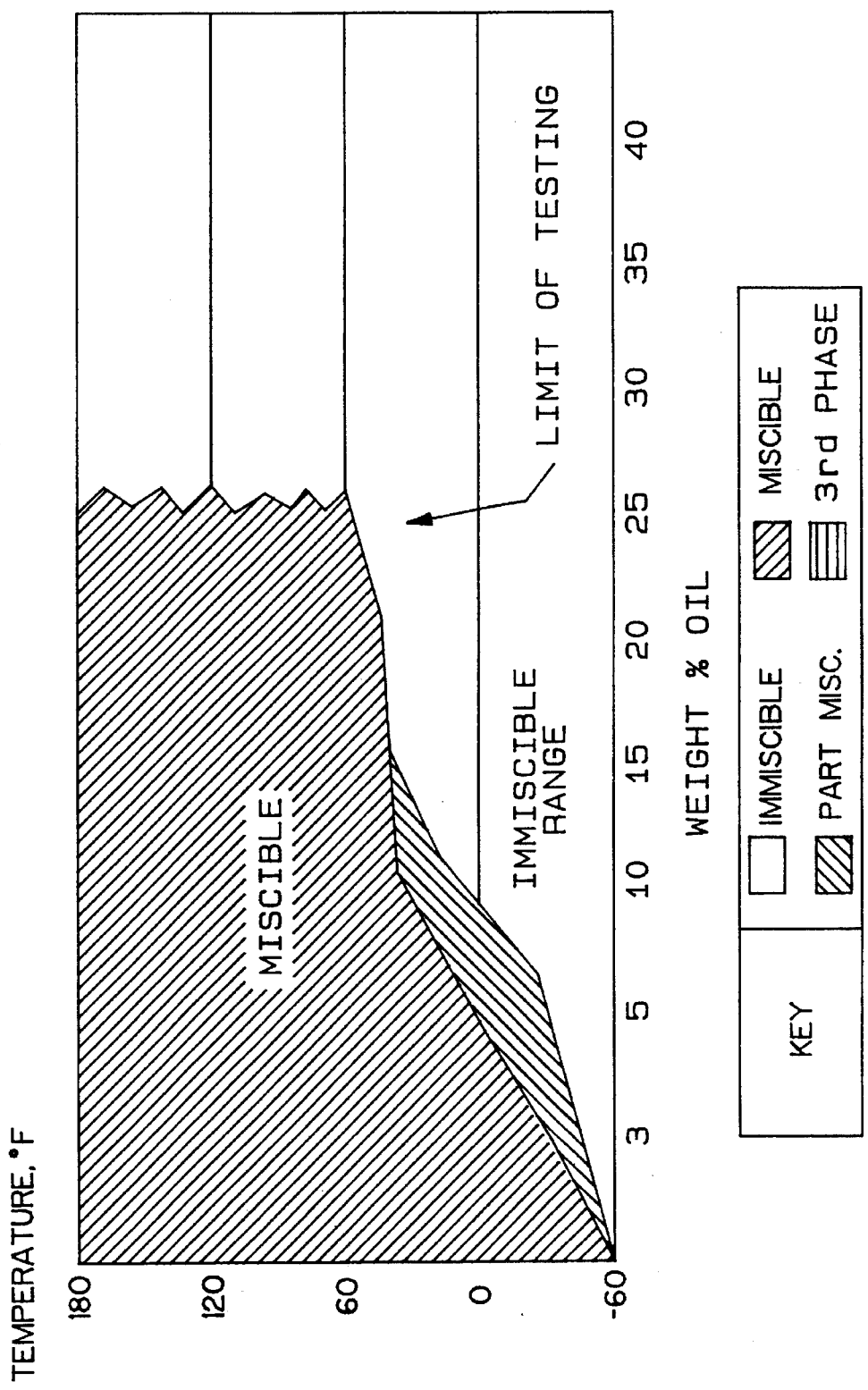
FIG. 6 shows miscibility limits with applicant's ester EXP-0395 with refrigerant HFC-134a at various weight percentages of oil verses temperature.

FIG. 6 shows miscibility limits with EXP-395 and HFC-134a, demonstrating another formulation containing branched C-9 acids in a dipentaerythritol ester.

Figure 7:
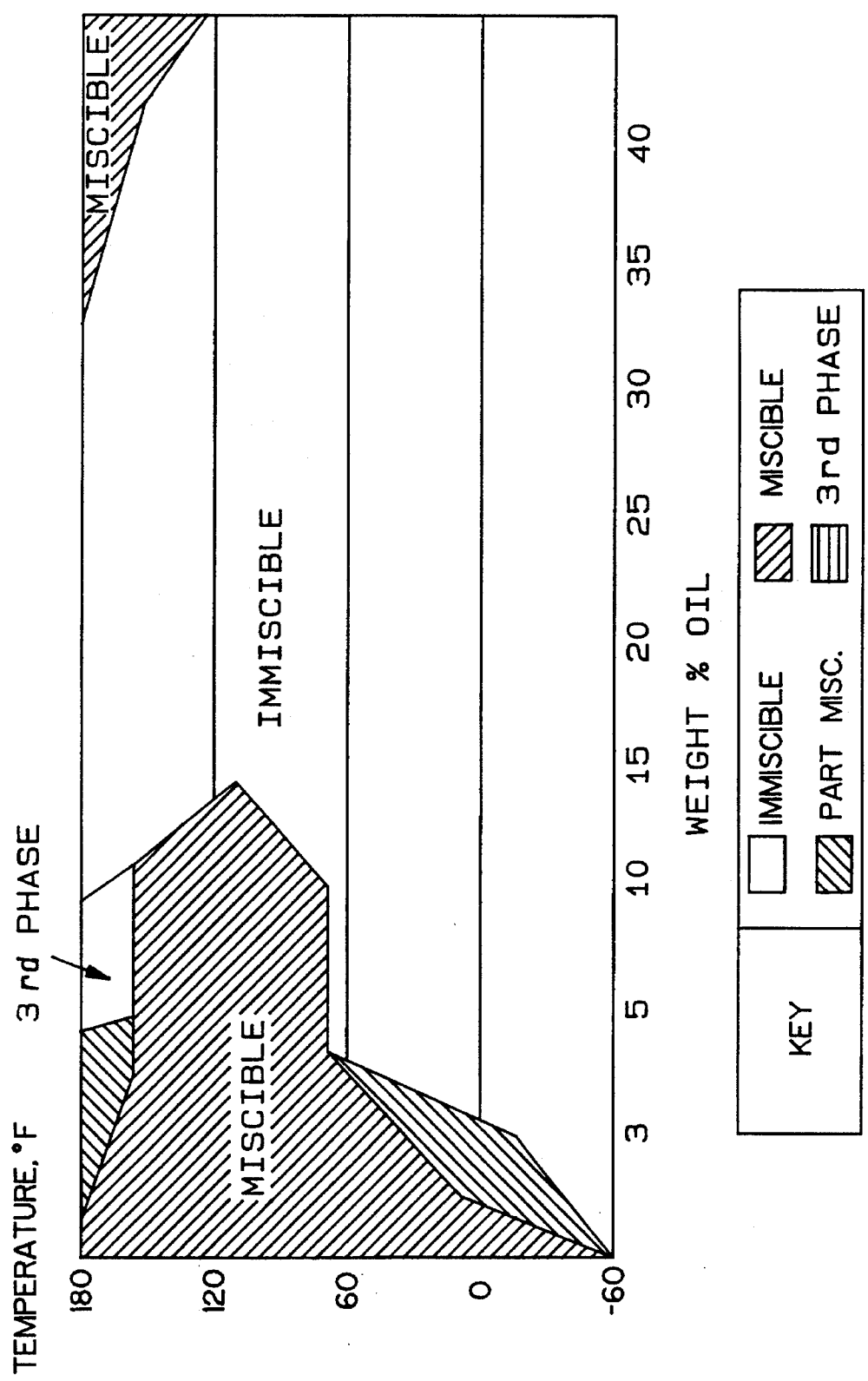
FIG. 7 shows miscibility limits of applicant's ester EXP-0323 with refrigerant HFC-134a at different weight percentages of oil against temperature.

FIG. 7 shows miscibility limits of applicant's ester EXP-0323 with the refrigerant HFC-134a. This ester has a viscosity of 123.9cSt. The ester is an unblended dipentaerythritol ester having what would be considered a midrange viscosity. The graph shows the miscibility of the ester over a wide range of temperatures. This ester is derived from an acid having 12.6% C-7 acids, 57.3% C-9 branched acids, and 29.1% C-10 acids.

Figure 8:
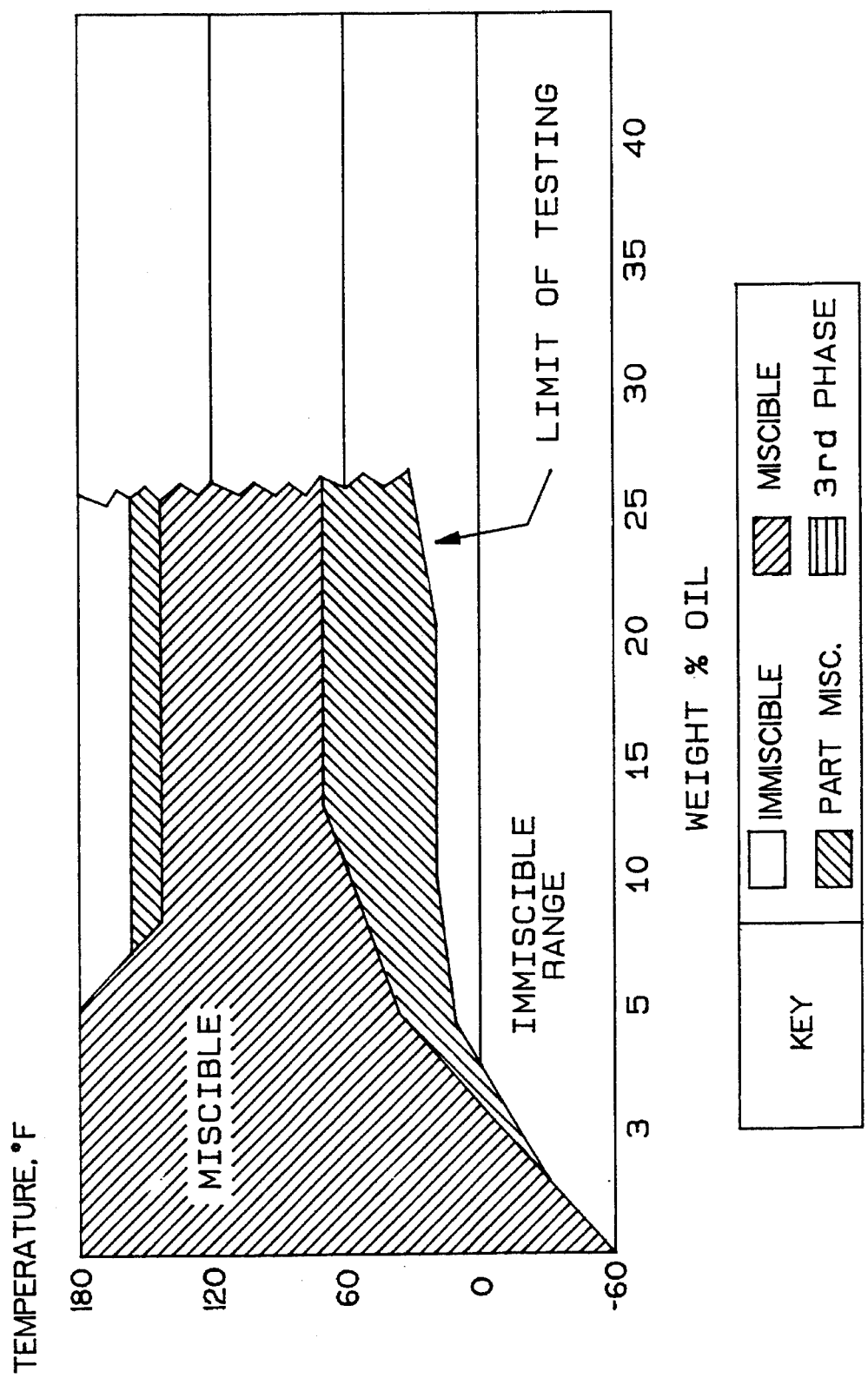
FIG. 8 shows miscibility limits of applicant's ester EXP-0397 with refrigerant HFC-134a at various weight percentages of oil against temperature.

FIG. 8 shows the miscibility limits with EXP-0397 ester with refrigerant HFC-134a. EXP-0397 is a blend of dipentaerythritol and TMP. The miscibility range over a broad temperature range is shown at a broad weight percentage oil range up to the limit of testing.

Figure 9:
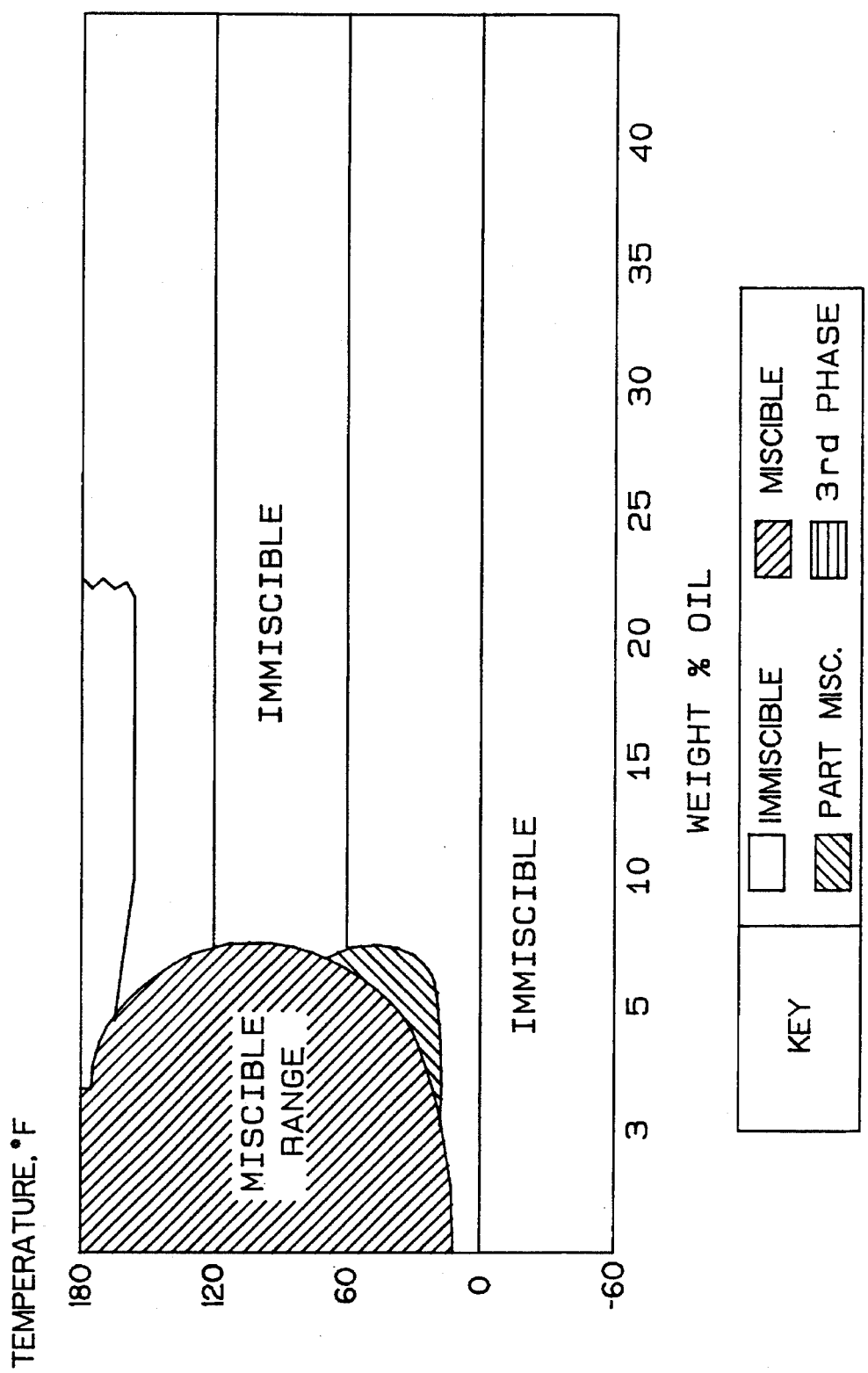
FIG. 9 shows miscibility limits with EXP-0397 comparing the ester with and without mineral oil.

FIG. 9 demonstrates the effect on miscibility limits of EXP-397 with and without mineral oil.

Figure 10:
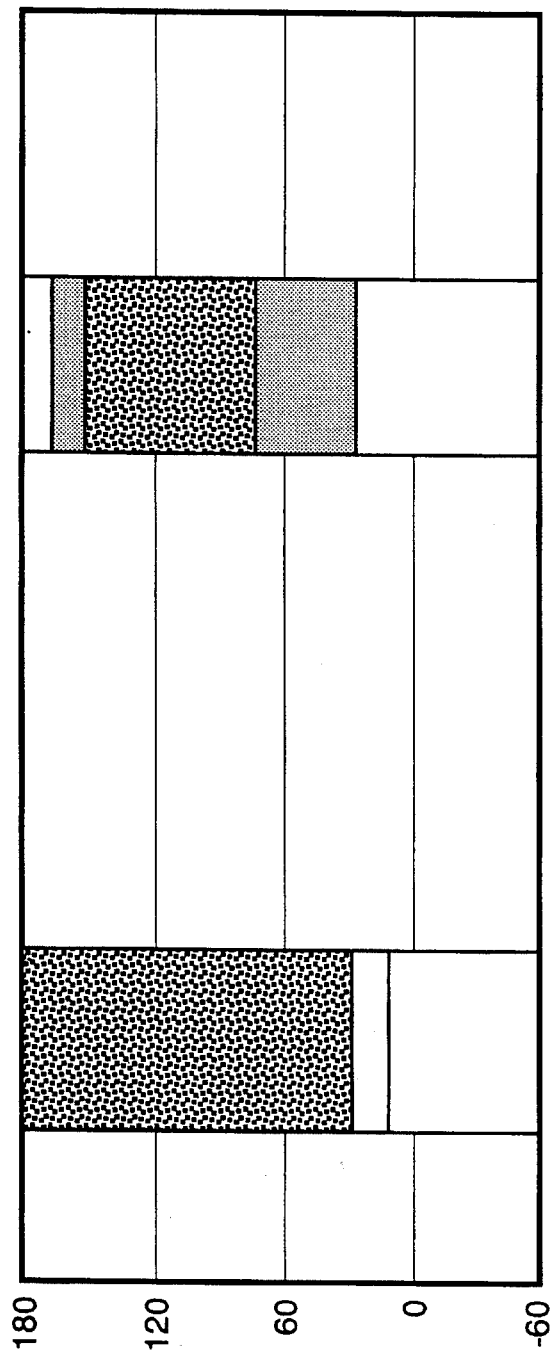
FIG. 10 shows miscibility limits with EXP-0395 comparing the ester with and without mineral oil.

FIG. 10 shows miscibility limits with HFC-134a refrigerant and the ester EXP-0395 with and without mineral oil added. This ester is a high viscosity ester having a viscosity of 178cTs. This ester all Di-PE ester composition, that is, it is unblended.

Figure 11:
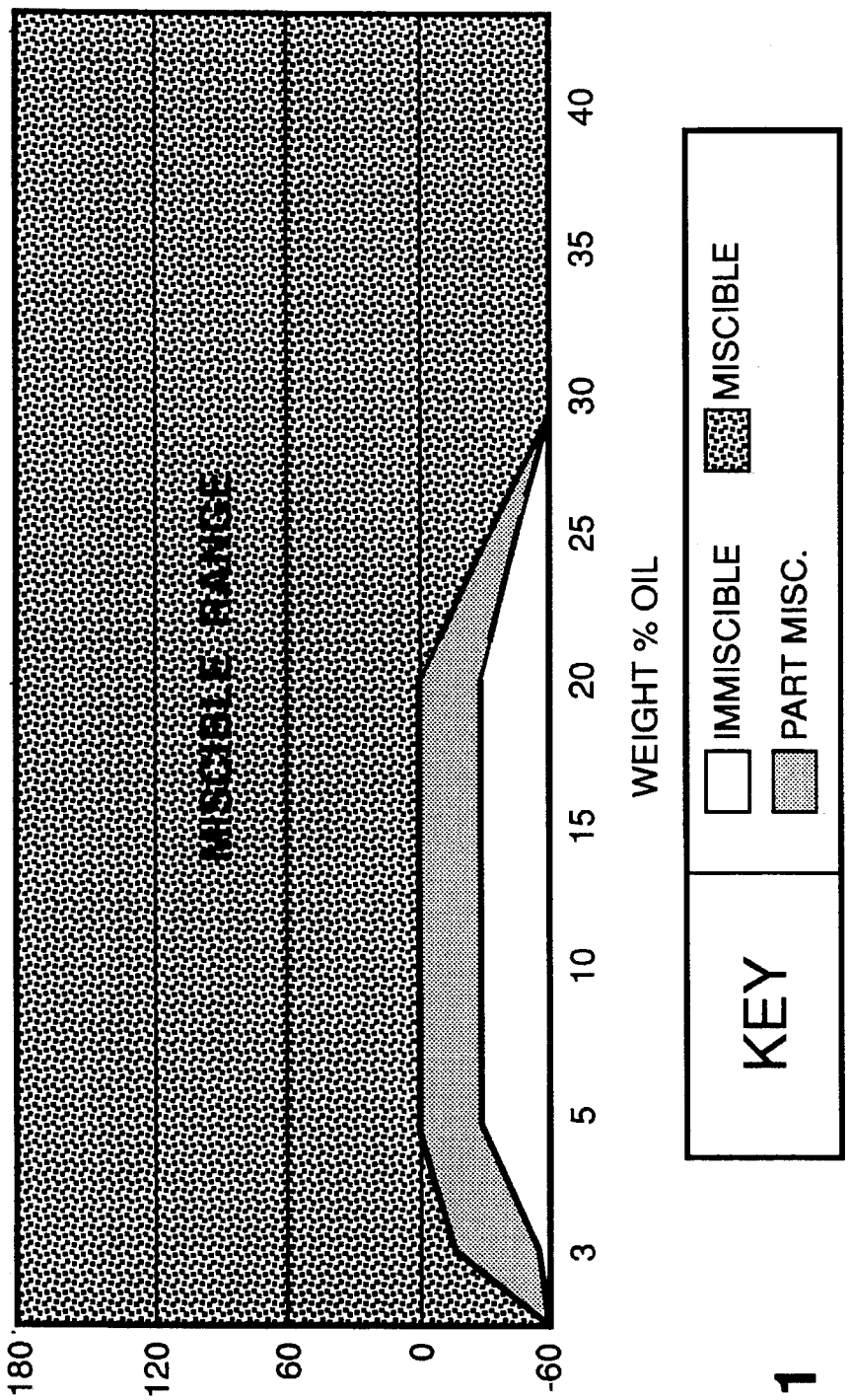
FIG. 11 is a graph similar to FIG. 7 wherein the refrigerant is tetrafluorodimethyl ether.
Figure 12:
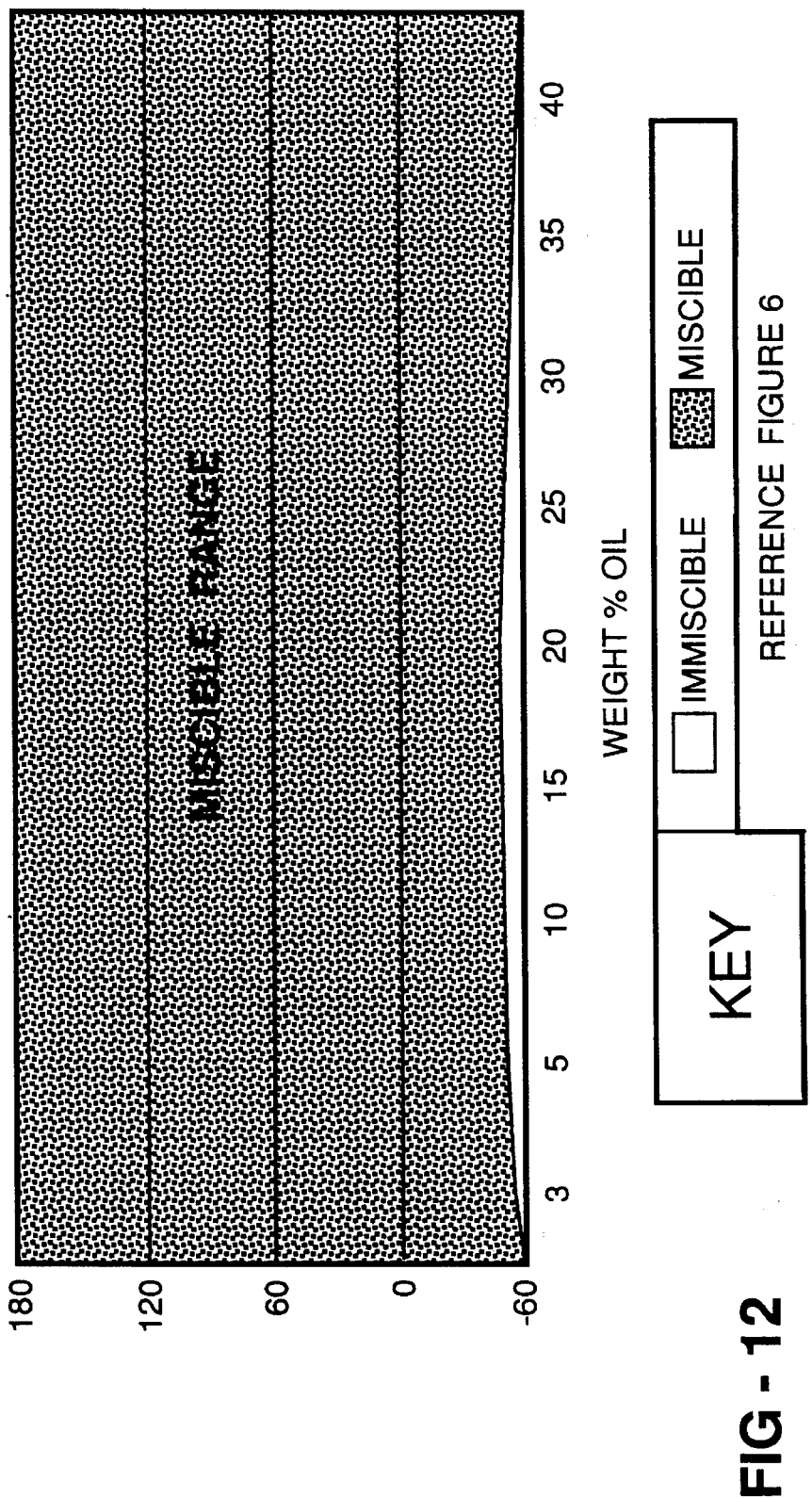
FIG. 12 is a graph similar to FIG. 6 wherein the refrigerant is tetrafluorodimethyl ether.
Figure 13:
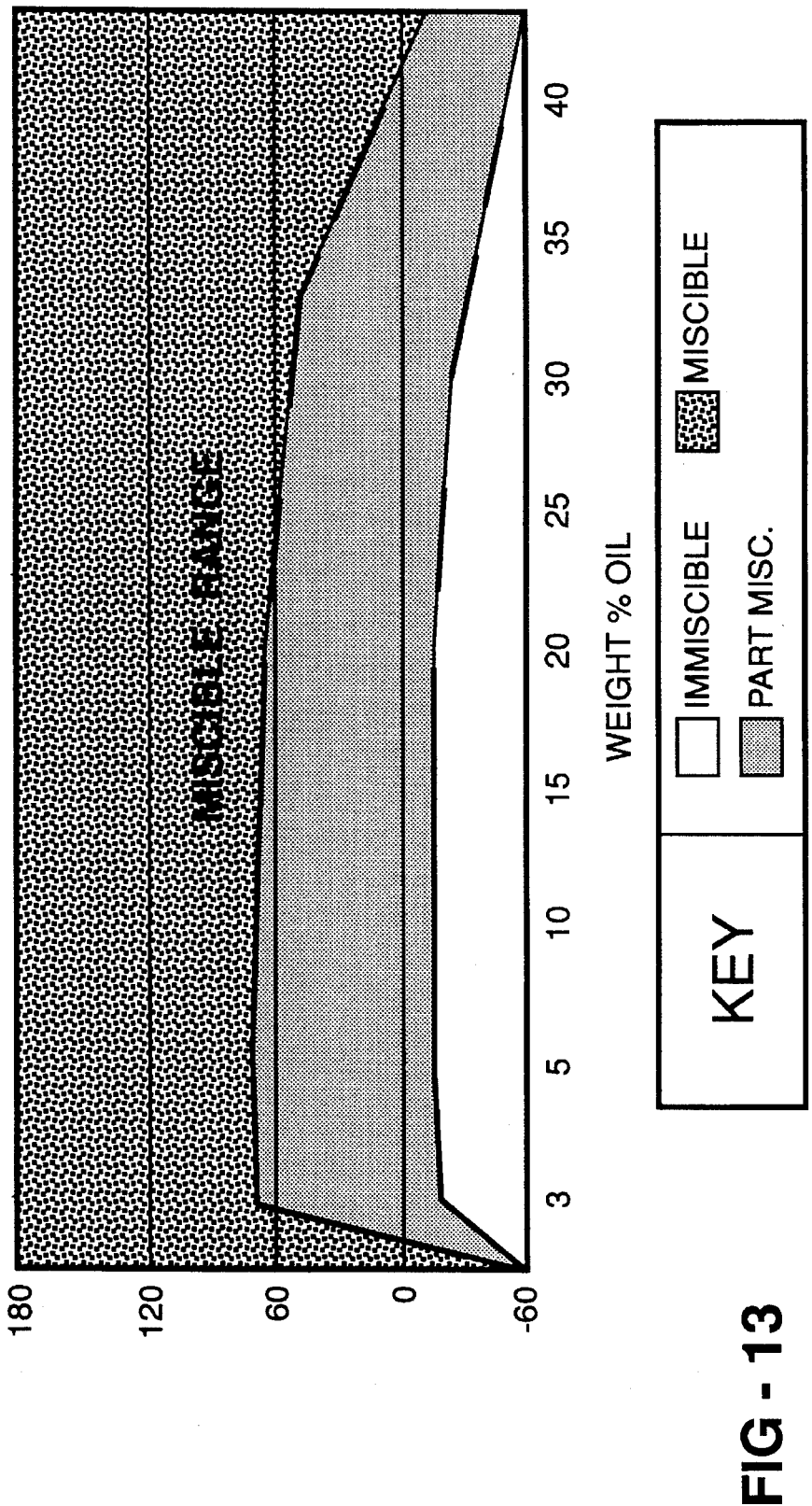
FIG. 13 is a graph similar to FIG. 11 wherein EXP-0448 is a blend of EXP-0323 with mineral oil and the refrigerant is tetrafluorodimethyl ether.
Figure 14:
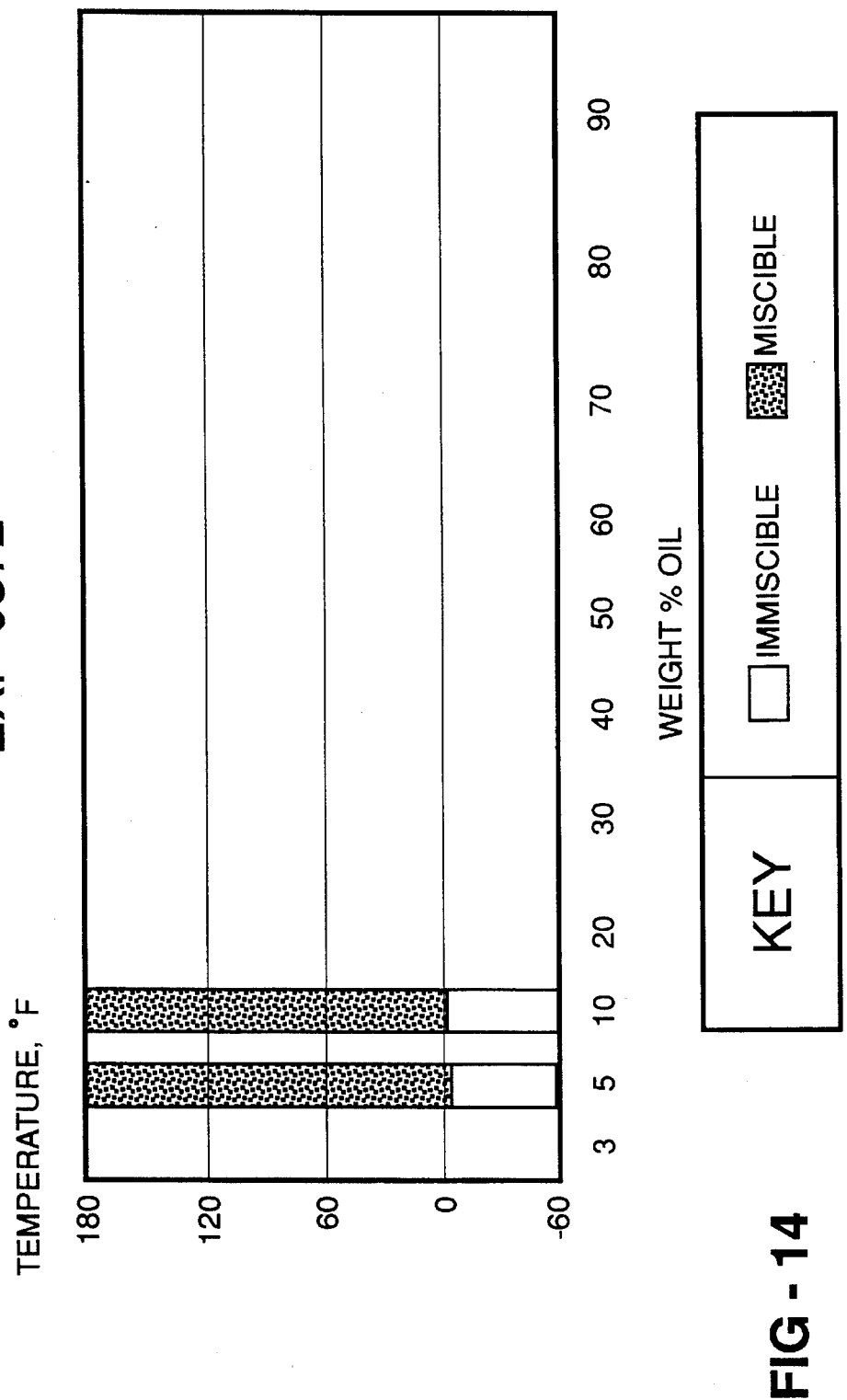
FIG. 14 is a graph showing the miscibility limits of HFC-134a with EXP-0372.
Figure 15:
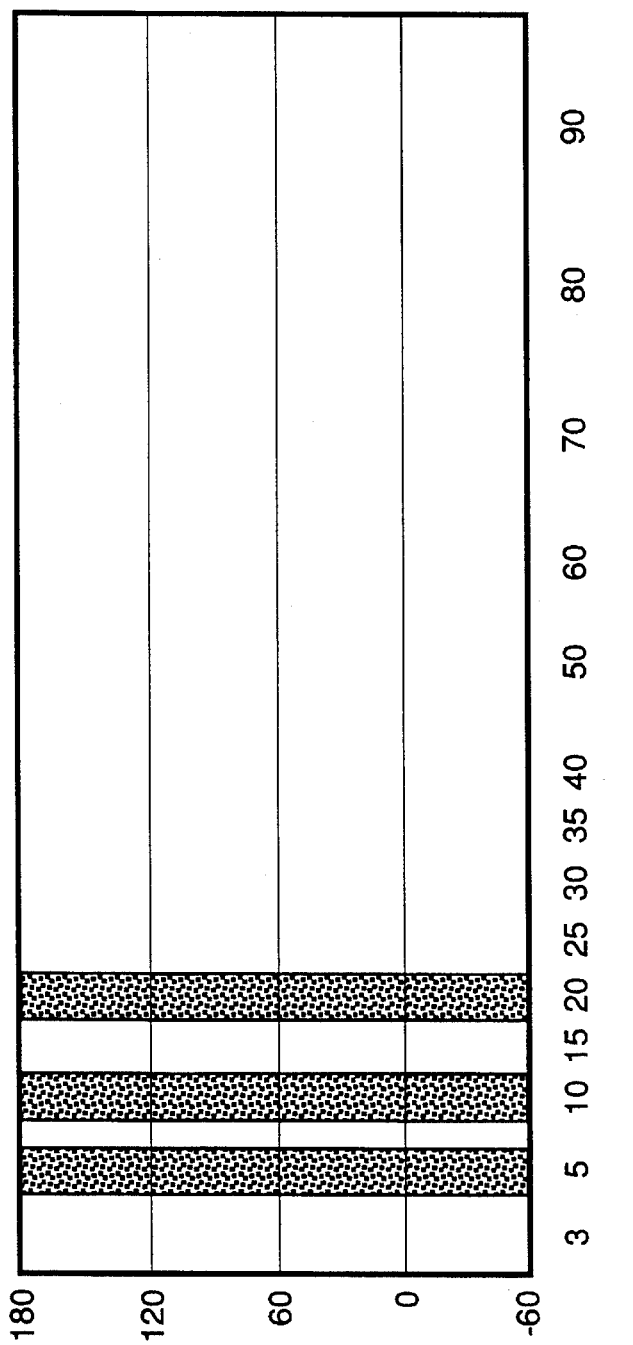
FIG. 15 is a graph similar to FIG. 14 showing miscibility limits with EXP-0521.
Figure 15:
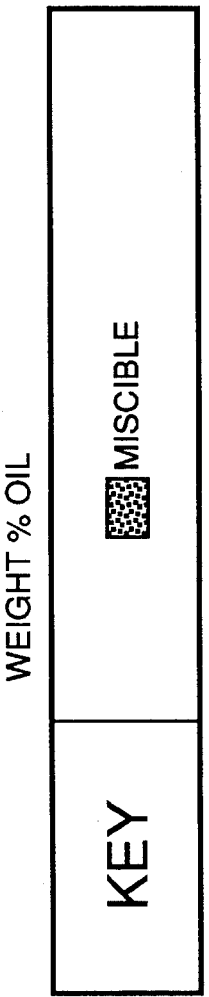
Figure 16:
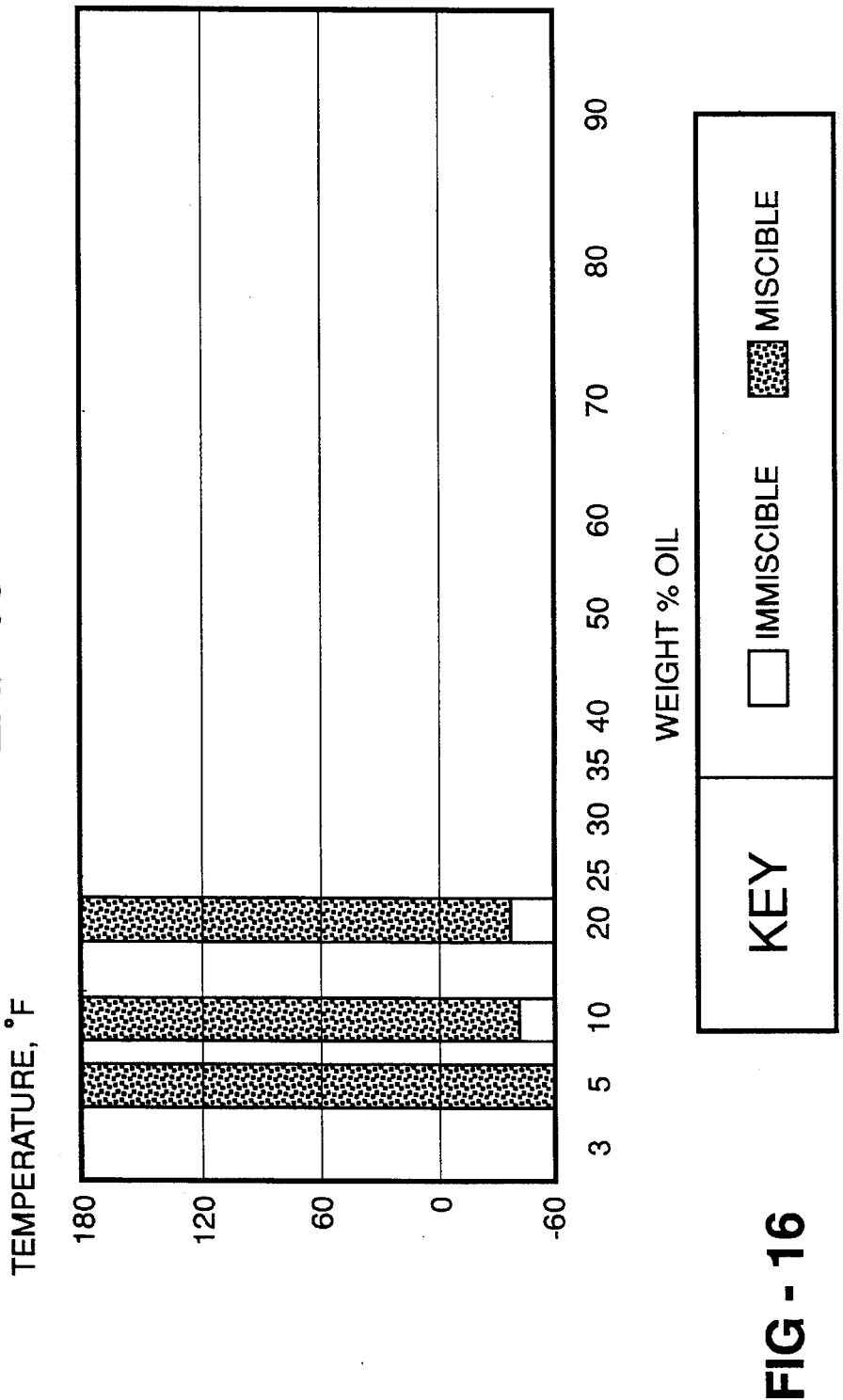
FIG. 16 is a graph similar to FIG. 14 showing miscibility limits with EXP-0522.
Figure 17:
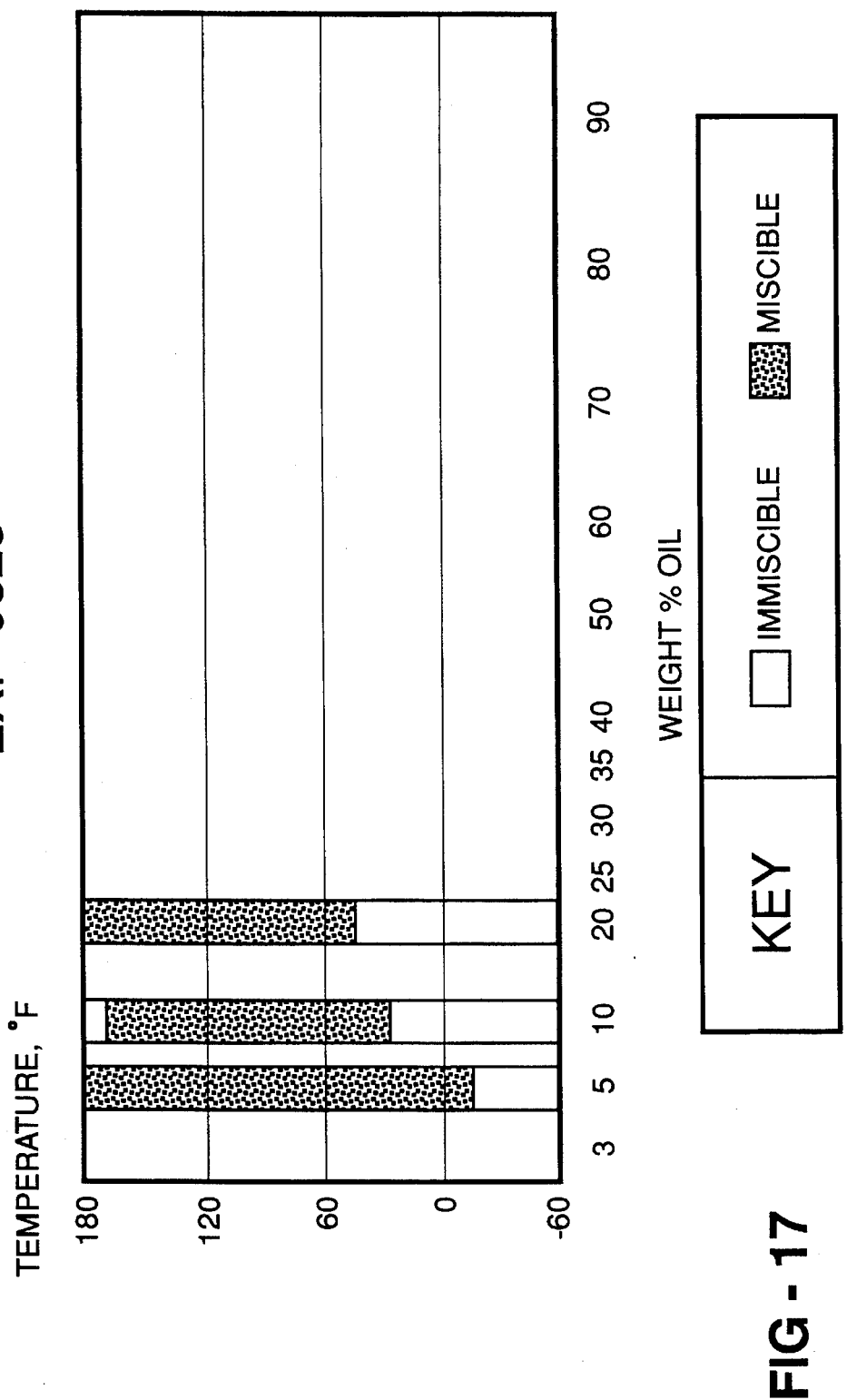
FIG. 17 is a graph similar to the aforementioned graphs showing miscibility limits with EXP-0523.
Figure 18:
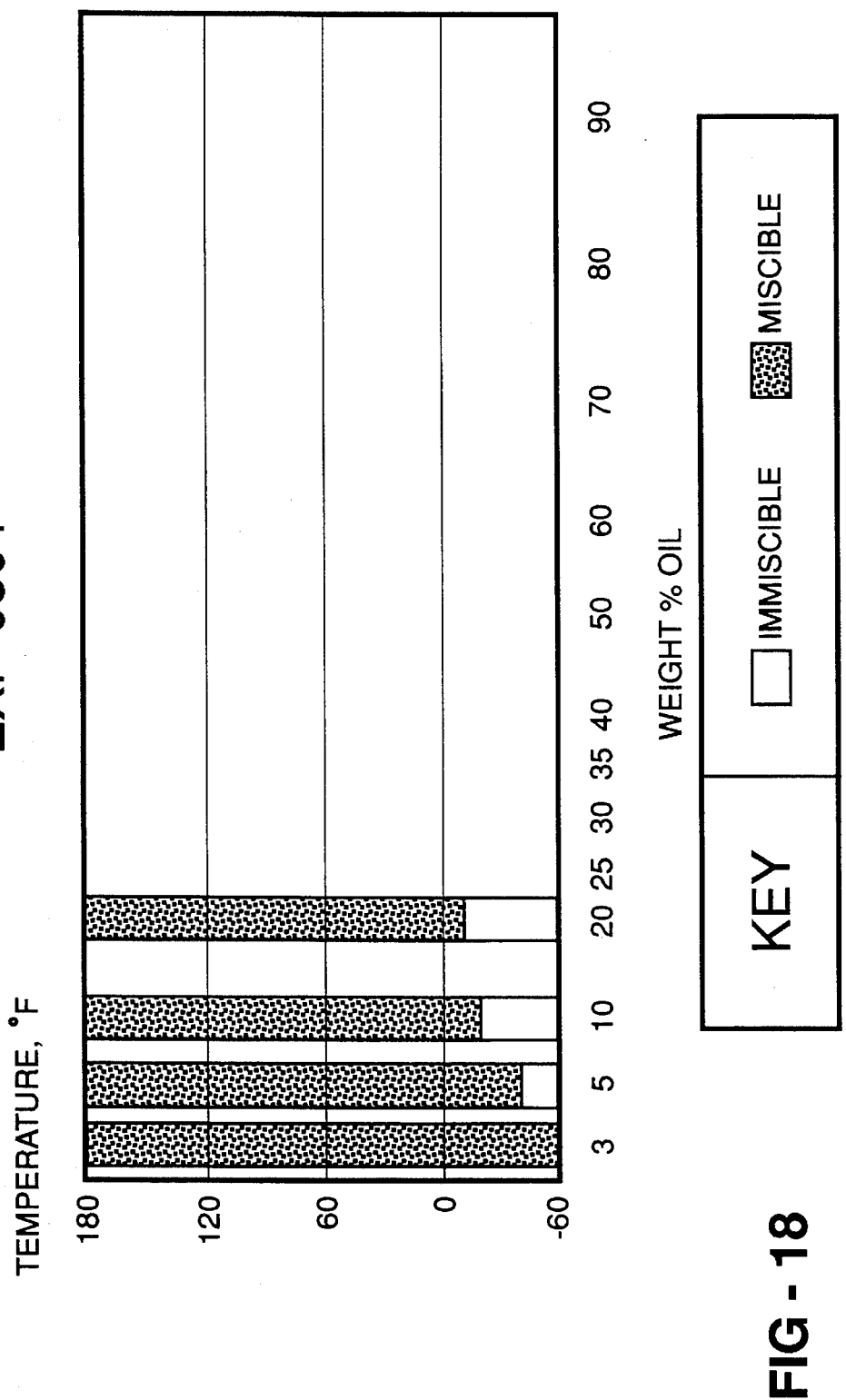
Figure 19:
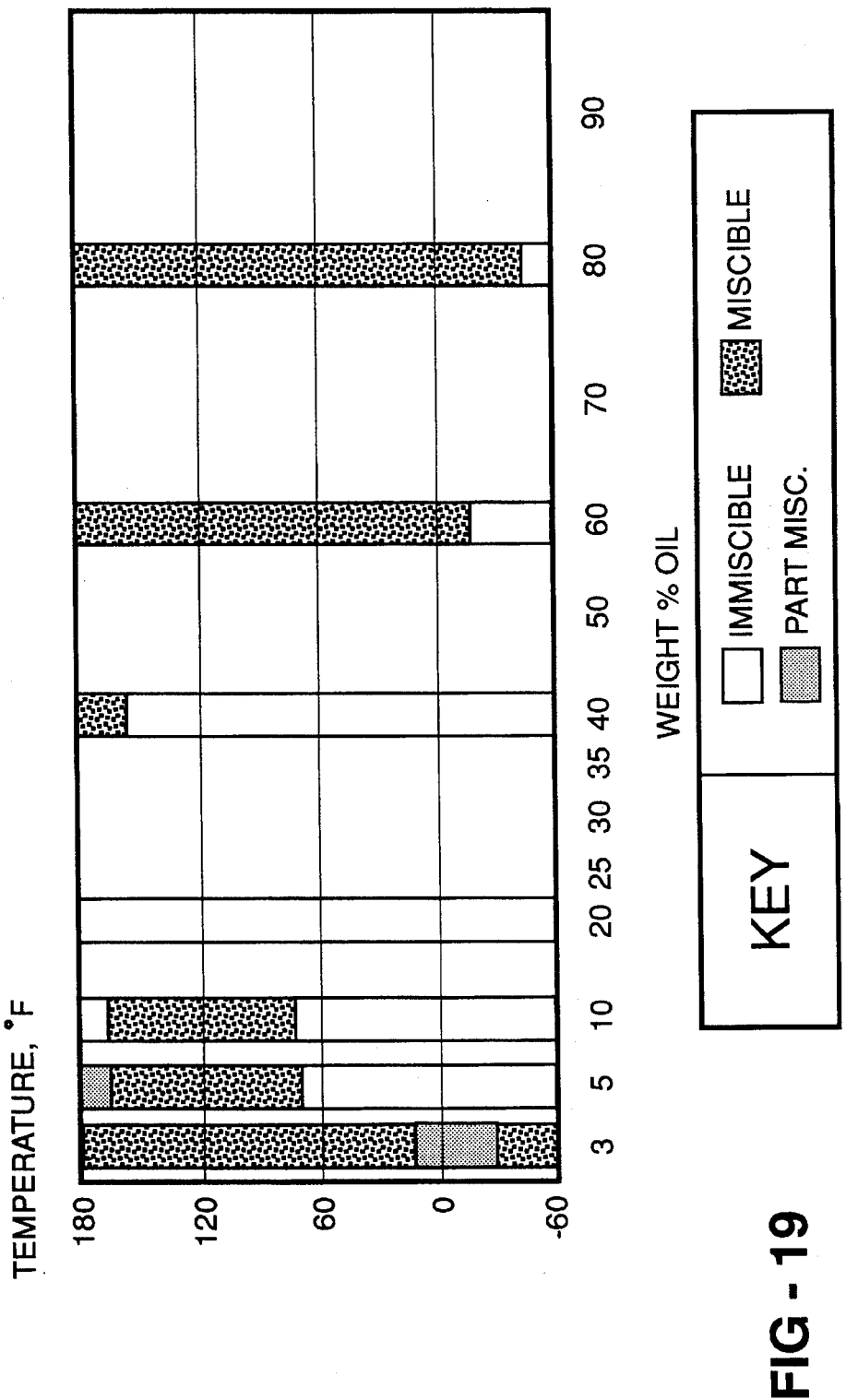
FIG. 19 shows miscibility limits with HFC-134a using EXP-0323.
Figure 20:
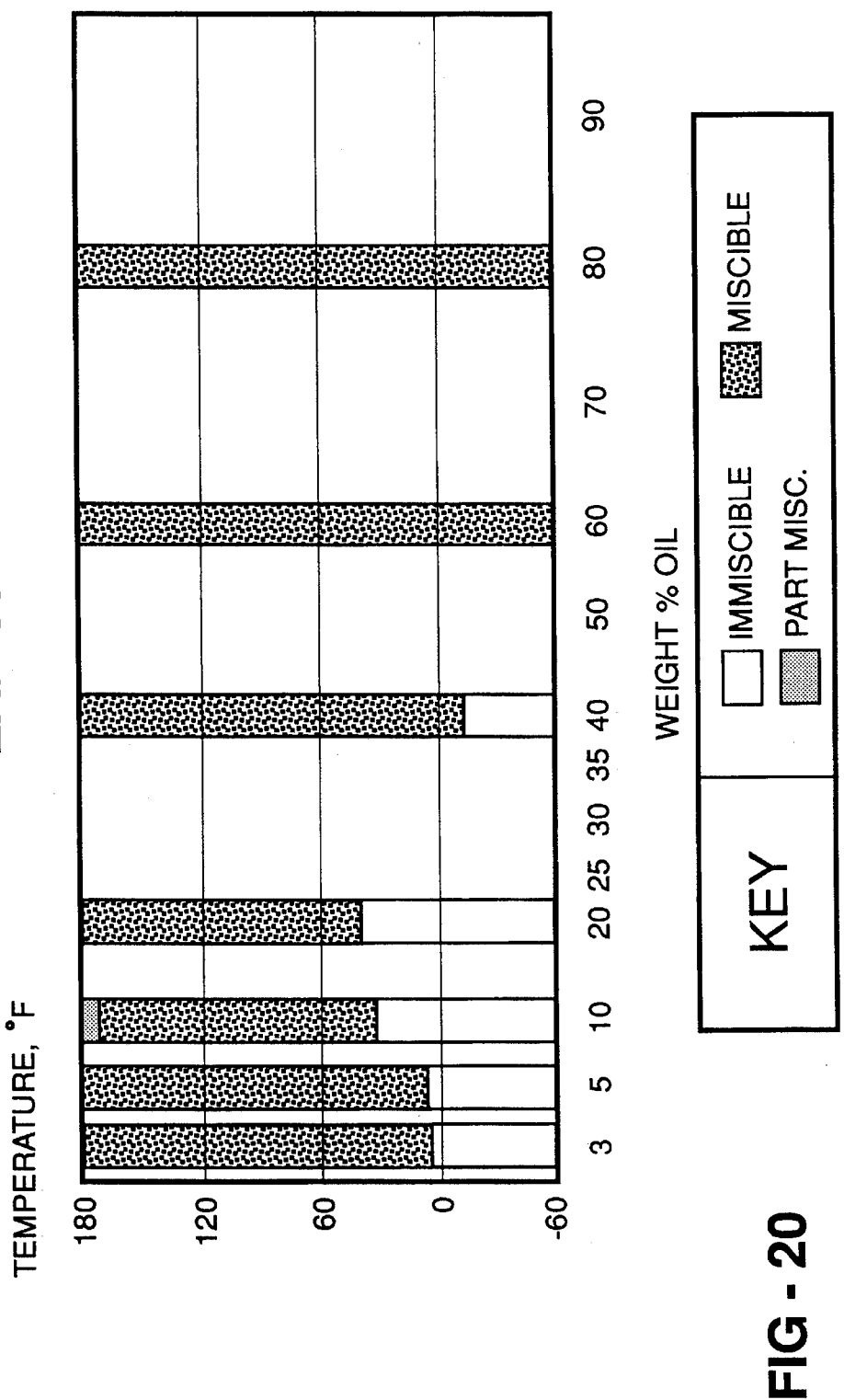
FIG. 20 is a graph similar to FIG. 19 showing miscibility limits of EXP-0341.
Figure 21:
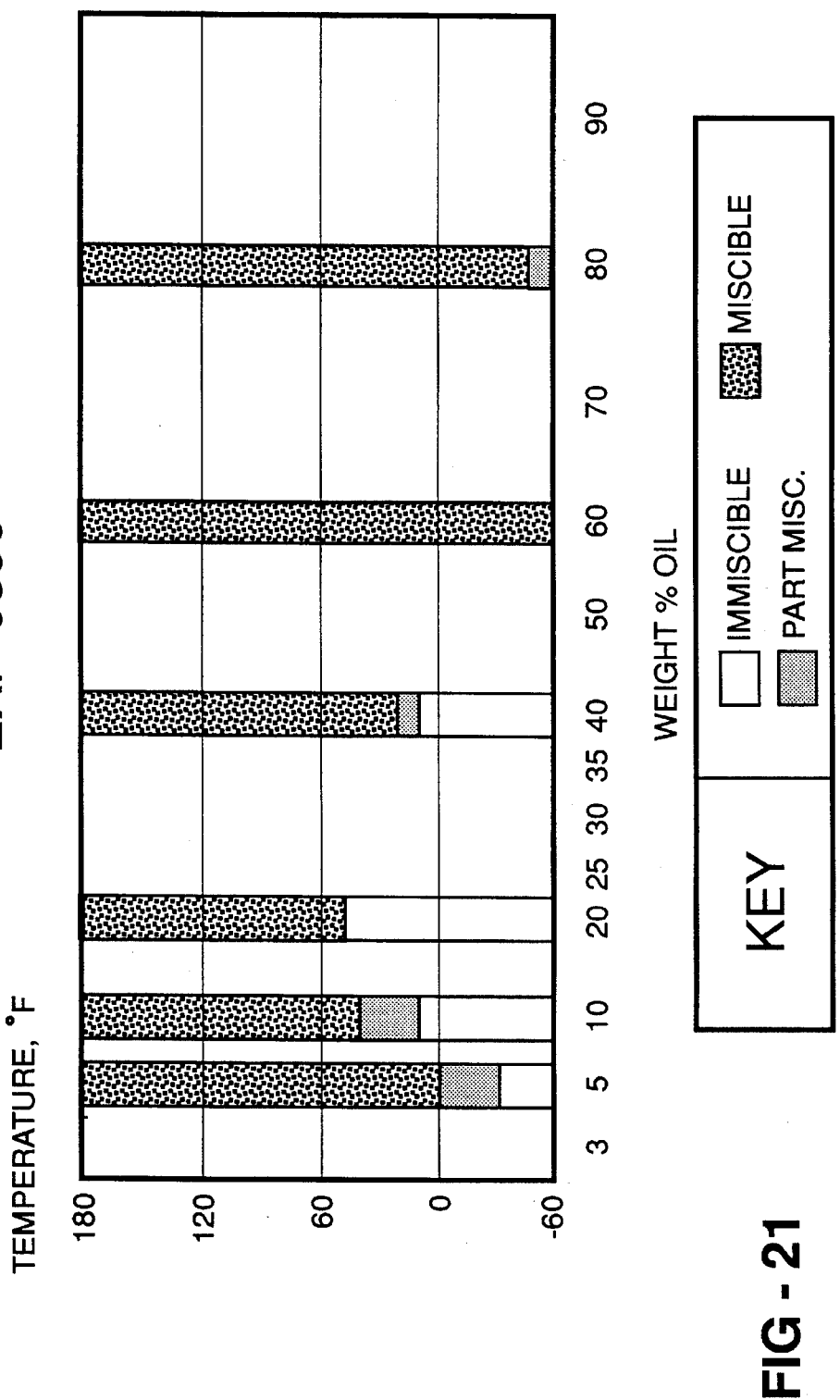
FIG. 21 is a graph showing miscibility limits with HFC-134a using EXP-0396.
Figure 22:
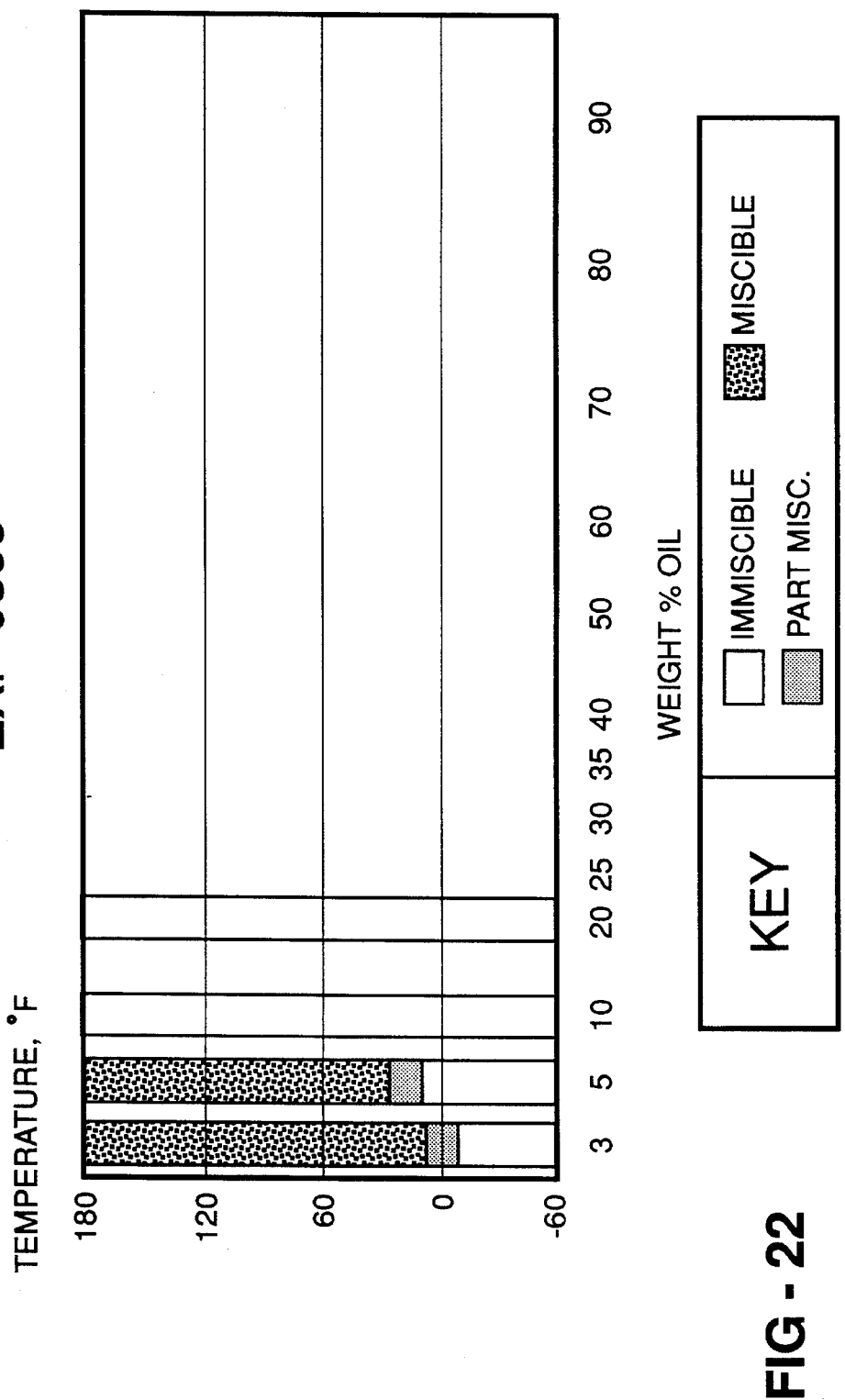
FIG. 22 is a graph similar to FIG. 21 showing miscibility limits of EXP-0395.

FIGS. 11–13 demonstrate miscible ranges of EXP-0323, EXP-0396, and EXP-0448 (ESP-0323 with 68 ISO 5% naphthenic mineral oil), respectively, with another non-chlorinated fluorinated refrigerant, tetrafluorodimethyl ether.

FIGS. 14–24 show the particular utility of formulations utilizing C-9 branched acids. FIGS. 14–22 particularly show miscibility limits of various formulation described above which are either C-9 branched acids or mixtures with C-7, C-8, and C-10 branched acids. The branched C-9 used was 3,5,5 tri methyl hexanoic acid, wherein the terminal group is a teritary butyl. Teritary butyl and other larger branched end groups provide steric hindrance. This improves thermal and oxidative stability as well as hydrolytic stability. This compound also includes branching at the beta carbon which is also desirable.

Figure 23:
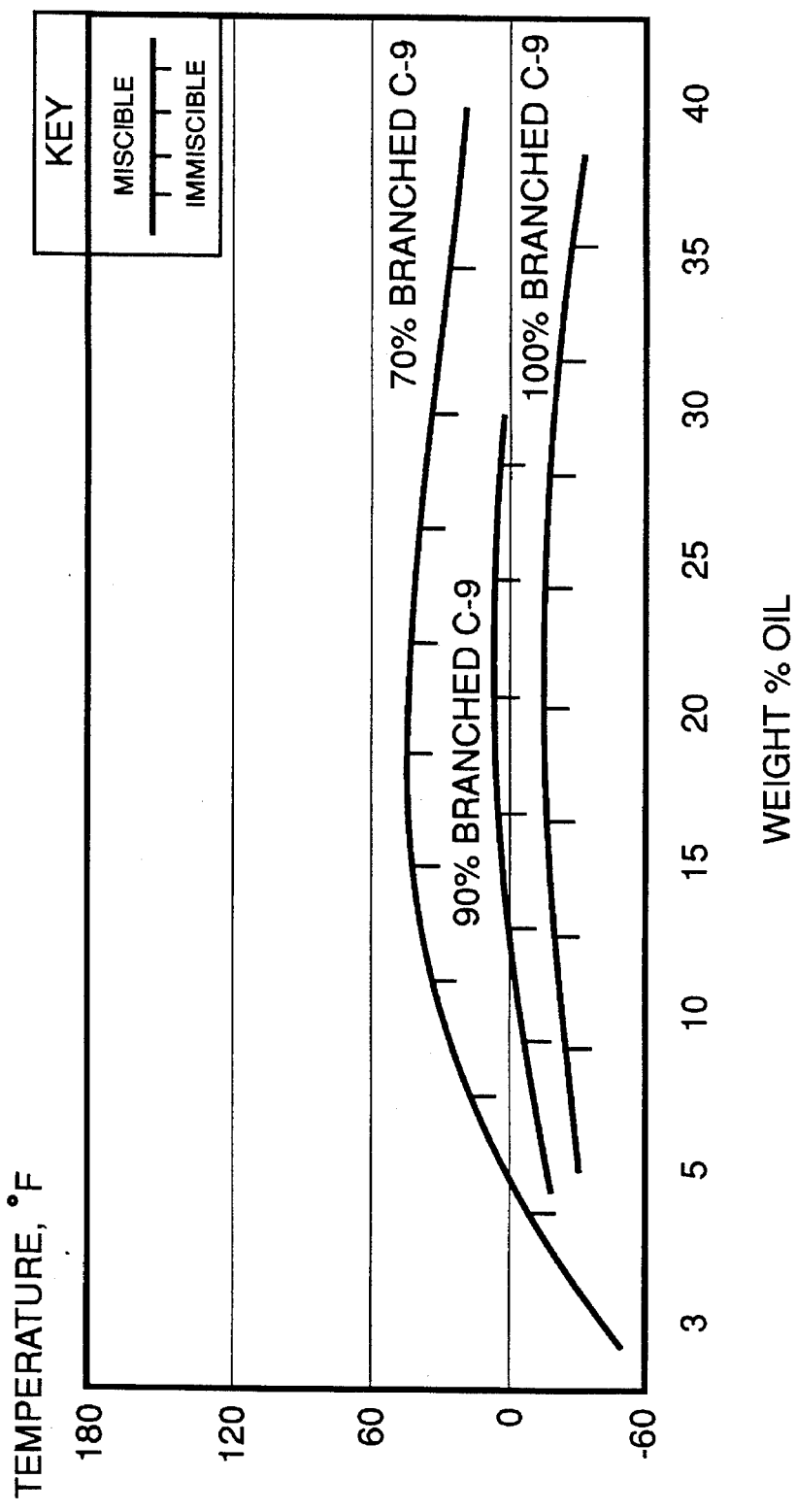
Figure 24:
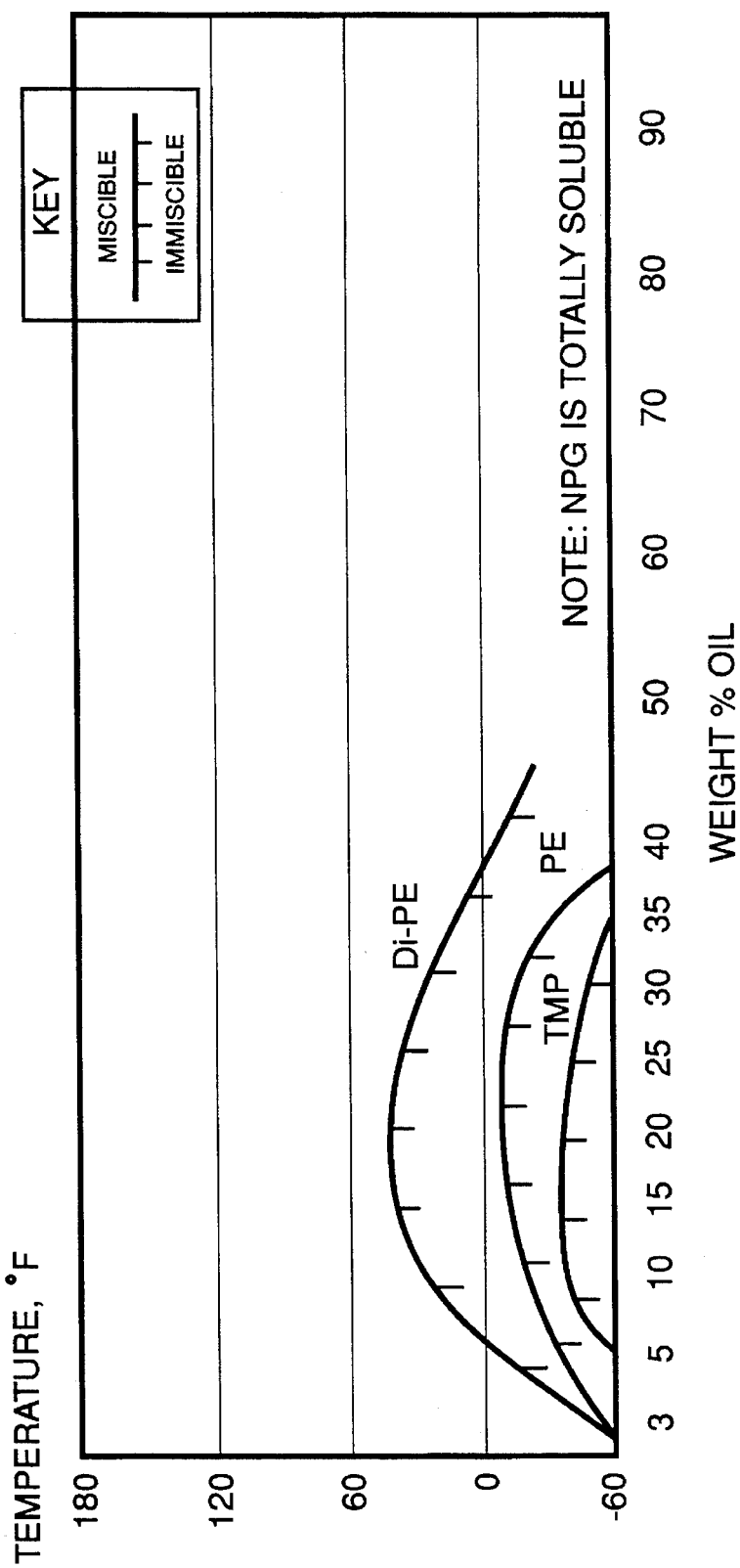
FIG. 24 is a graph similar to FIG. 23 showing miscibility limits of about 100% branched C-9 acid with various alcohols.

FIGS. 23 and 24 specifically show misibility limits of branched C-9 acids in different concentrations in FIG. 23 and with various alcohols in FIG. 24. This data in general demonstrates the broad range utility of the present invention and its adaptability to various uses requiring different miscibilities over broad ranges.

For each of the experimental lubricant fluids applicant has obtained miscibility with R 134a between at least the temperatures of 20° F. and 80° F. with a weight per cent of 3% oil to refrigerant and while providing a viscosity of a least substantially 39 cSt at 40° C. Such miscibility at the evaporator of the compression refrigeration system renders the fluid suitable for a number of such systems. The fluids, in fact, demonstrate miscibility up to about 170° F. at viscosities of or above 55.9 cSt at 40° C.

For each of the experimental lubricant fluids applicant has obtained miscibility with R 134a between at least the temperatures of 70° F. to 150° F. at 5% oil to refrigerant R 134a while providing a viscosity of at least substantially 39 cSt at 40° C. For the fluids involved EXP-0323 exhibits the least miscibility at the viscosity noted while EXP 0523 exhibits the greatest viscosity range of the experimental fluids disclosed. EXP 0323 is well suited to use in rotary and centrifugal compression systems where the percentage of oil to refrigerant is low in the evaporative stage of the system due to the presence of oil separators or other devices for limiting the oil to refrigerant ratio. EXP 0396 is well suited to use in reciprocation compressor systems such as are used in automotive air conditioning where oil content may be 15–20% by weight of the lubricant at the evaporator. Some of the fluids can have a minor amount by weight of mineral oil while still maintaining the required miscibility.

A very wide range of miscibility of several of these fluids with tetrafluorodimethyl ether, which is used in water chilling compression refrigeration systems, for example, is noted.

In view of the above data, it can be concluded that applicant has shown improved hydrofluorocarbon miscibility and increased viscosity with increased branched carboxylic acid derivation with blended and unblended esters. Other results are obtained with utilizing linear acids with the branched acids used to form the esters in the sense that hydrolytic stability, lubricity, the viscosity index, and pourability are found to be improved. However, linear acids above C-11 are not useful because they unduly decrease miscibility.

The lubricant compositions may also be understood to include the usual additions such as anti-oxidants, corrosion inhibitors, hydrolysis inhibitors, etc., such as identified in U.S. Pat. No. 4,851,144 which is incorporated by reference herein. The percentages used in the foregoing description and claims are to be considered as the compositions defined prior to the addition of such additives.

Applicant further conducted stability and falex tests on the ester EXP-0323 showing the effect on a refrigerant as compared to the refrigerant not including the ester. The ester is a dipentaerythritol ester including by weight 12.6% C-7 acids, 57.3% branched acids and 29.1% C-10 acids.

EXP-0323 was exposed to HFC-134a for 14 days with hermetic motor materials and with various elastomers in a Parr-bomb (sealed stainless steel vessel). Tests were conducted at 194° F. and 347° F. using 50% refrigerant and 50% EXP-0323. The effect on the materials was found to be acceptable by both a compressor manufacturer and the motor manufacturer. There were essentially no adverse effects either on the lubricant or the refrigerant. Additional tests were made on EXP-0395 and EXP-0396 at 347° F. with similar results.

Falex tests, described as follows, were run with steel pin and vee block.

The loading device was engaged to produce a load of 350 pounds. The machine was allowed to run for five hours at this load or approximately 87,000 cycles. Wear to the steel specimens was measured in terms of weight loss.

The results were obtained with and without HFC-134a. The tests were conducted in the presence of the polyglycol and applicant's ester EXP-0323. The results are shown on Table II.

Without the HFC-134a, the results were essentially the same for the EXP-0323 ester and the polyglycol. The EXP-0323 was actually better in the presence of the HFC-134a refrigerant than without the refrigerant. The polyglycol was inferior to the EXP-0323 in the presence of the refrigerant. Polyglycol lubricants used with HFC-134a are also known to create problems with copper components. The polyglycol used had essentially the same viscosity as the ester EXP-0323.

Chemical stability measurements for refrigeration lubricants are generally measured by the "sealed tube method." In this test, the lubricant and the refrigerant are charged into a glass tube along with a strip of valve steel and aged for a period of time at an elevated temperature (Spauschus 1984). Additional metals such as copper or aluminum may also be added. The lubricant and metal specimen are visually inspected. The gas may be analyzed through gas chromatography methods. The lubricant may also be analyzed for changes in composition and metal content (Sanvordenker 1985).

EXP 0396 was run in the following refrigerants for fourteen days with no observable changes: E-134, E-245, and R134a.

More specifically, the lubricant and refrigerant are placed in a sealed tube with copper and steep catalysts and heated to 347° F. for fourteen days, very favorable results were obtained with the esters disclosed in the aforesaid table and the refrigerants identified in the drawings. No reaction or degradation was noted even when the test was extended an additional fourteen days.

The results indicate the lubricant is stable in this environment. No evidence of copper plating was noted. The R-134a was tested for deterioration and found to be essentially unchanged in composition. Initial physical and chemical tests on the lubricants show no observable change. Equally good results have been obtained with HFC ethers and most CFC and HCFC type refrigerants.

The invention has been described in an illustrative manner, and it is to be understood that the terminology which has been used is intended to be in the nature of words of description rather than of limitation. For example, the carboxylic acids used in applicant's experimental fluids are mono-carboxylic. However, the term carboxylic acid as used in the claims means a compound containing the carboxyl groups, —COOH. Thus, the compositions claimed may derive from di-carboxylic acids or combinations of mono-carboxylic and di-carboxylic acids, either branched or linear, within the meaning of the terms carboxylic acid. Also the terms mono or di-pentaerythritol esters when used in the claims are intended to further include those esters formed when the alcohol is fluorinated prior to the reaction with the organic acids which produce the ester.

Obviously, many modifications and variations of the present invention are possible in light of the above teachings. It is, therefore, to be understood that within the scope of the appended claims the invention may be practiced otherwise than as specifically described.

TABLE I

EXPERIMENTAL FLUIDS
PHYSICAL CHARACTERISTICS

| Lubricant | Viscosity, cSt @ 40° C.' | Viscosity, cSt @ 100° C. | Description of ester |
| --- | --- | --- | --- |
| EXP-0316 | 55.9 | 8.6 | Blend. Dipentaerythritol ester with TMP ester. (1.) DI-PE ester 73% (derived from 12.6% C-7; 57.3% branched C-9; 29.1% C-10 acids) (2.) TMP ester 27% (derived from 50% C-5; 50% C-7 acids) |
| EXP-0323 | 123.9 | 14.7 | Dipentaeryithritol |

TABLE I-continued

EXPERIMENTAL FLUIDS
PHYSICAL CHARACTERISTICS

| Lubricant | Viscosity, cSt @ 40° C.' | Viscosity, cSt @ 100° C. | Description of ester |
|---|---|---|---|
|  |  |  | ester (derived from 12.6% C-7; 57.3% branched C-9; 29.1% C-10 acids) |
| EXP-0440 | 114.3 | 13.87 | Blend of one DI-PE ester with another Di-PE ester (1.) Di-PE 67% derived from 15% C-7, 15% C-8, C-10, 70% branched c-9 acids) (2.) DI-PE ester 33% derived from 60% C5 25% C-8, 15% C-10 acids). |
| EXP-0395 | 177.7 | 12.8 | Dipentaerythritol ester (derived from 15% C-7; 15% C-8, C-10; 70% branched C-9 acids) |
| EXP-0396 | 63.7 | 8.8 | Monopentaerythritol ester (derived from 70% branched C-9; 30.% C-7, C-8, C-10 acids) |
| EXP-0397 | 107 | 12.9 | Blend. Dipentaerythritol ester with TMP ester. (1.) DI-PE ester 87.5% (derived from 15% C-7; 15% C-8, C-10; 70% branched C-9 acids) (2.) TMP ester 12.5% (derived from 50% C-5; 50% C-7 acids) |
| EXP-0372 | 29.5 | 5.5 | 75% C-7; 25% Branched C-9 |
| EXP-0521 | 13–14 | 3.15 | Branched C-9, NPG |
| EXP-0522 | 37.26 | 7.04 | Branched C-9, TMP |
| EXP-0523 | 371.42 | 24.9 | Branched C-9, DI-PE |
| EXP-0504 | 111.5 | 12.4 | Branched C-9, PE |

TABLE II

|  | Without HFC-134a Wt. Loss (grams) | With HFC-134a Wt. Loss (grams) |
|---|---|---|
| Polyglycol | 0.0375 | 0.0578 |
| EXP-0323 | 0.0445 | 0.0007 |

What is claimed is:

1. A fluid composition comprising a non-chlorinated, fluorinated hydrocarbon refrigerant and an ester lubricant base having a viscosity suitable for compression refrigeration and miscible in said non-chlorinated, fluorinated, hydrocarbon refrigerant in the range from 20° F.–80° F. at a percent by weight of lubricant base to refrigerant of at least 3%, said lubricant base consisting essentially of an ester made by reacting mono-pentaerythritol with an acid blend consisting of substantially 70% branched 3, 5, 5, tri-methylhexanoic acid and a remainder comprising a mixture of substantially linear carboxylic $C_7$, $C_8$, and $C_{10}$ acid.

2. A method of making a fluid composition for use in a compression refrigeration system including blending non-chlorinated, hydrofluorocarbon refrigerant and a lubricant base composition comprising an ester lubricant base having a viscosity suitable for compression refrigeration and miscible in said non-chlorinated, fluorinated, hydrocarbon refrigerant in the range from 20° F.–80° F. at a percent by weight of lubricant base to refrigerant of at least 3%, said lubricant base consisting essentially of an ester made by reacting mono-pentaerythritol with acid blend consisting of substantially 70% branched 3, 5, 5, tri-methylhexanoic acid and a remainder comprising a mixture of substantially linear carboxylic $C_7$, $C_8$, and $C_{10}$ acid.

3. A method of lubricating compression refrigeration equipment by lubricating said equipment with a fluid composition comprising a non-chlorinated, fluorinated hydrocarbon refrigerant and an ester lubricant base made by reacting mono-pentaerythritol with an acid blend consisting of substantially 70% branched 3, 5, 5, tri-methylhexanoic acid and a remainder comprising a mixture of substantially linear carboxylic $C_7$, $C_8$, and $C_{10}$ acid.

* * * * *